(12) United States Patent
Liu et al.

(10) Patent No.: US 10,630,806 B2
(45) Date of Patent: Apr. 21, 2020

(54) METHOD AND DEVICE FOR DISPLAYING AUDIO PLAYBACK APPLICATION COVER

(71) Applicant: Xiaomi Inc., Beijing (CN)

(72) Inventors: Xushu Liu, Beijing (CN); Lin He, Beijing (CN); Can Zhou, Beijing (CN)

(73) Assignee: Xiaomi Inc., Beijing (CN)

( * ) Notice: Subject to any disclaimer, the term of this patent is extended or adjusted under 35 U.S.C. 154(b) by 860 days.

(21) Appl. No.: 15/165,466

(22) Filed: May 26, 2016

(65) Prior Publication Data

US 2017/0054788 A1    Feb. 23, 2017

(30) Foreign Application Priority Data

Aug. 21, 2015  (CN) .......................... 2015 1 0518879

(51) Int. Cl.
*H04L 29/08*     (2006.01)
*G06F 16/432*    (2019.01)
*G06F 16/58*     (2019.01)

(52) U.S. Cl.
CPC ............ *H04L 67/32* (2013.01); *G06F 16/433* (2019.01); *G06F 16/58* (2019.01)

(58) Field of Classification Search
CPC ....... G06F 16/433; G06F 16/58; G09G 3/001; H04L 67/06; H04L 67/32; H04L 67/42
See application file for complete search history.

(56) References Cited

U.S. PATENT DOCUMENTS 8,429,109 B2    4/2013  Nakajima et al.
8,819,551 B2    8/2014  Ozawa
9,158,792 B2   10/2015  Yu et al.
2007/0009234 A1   1/2007  Van De Sluis
2008/0154962 A1*  6/2008  Yu .......................... G06Q 10/00
2008/0196080 A1   8/2008  Ozawa
2009/0003731 A1*  1/2009  Nitta ..................... G06F 3/1423
                                                          382/298
2011/0071977 A1   3/2011  Nakajima et al.
(Continued)

FOREIGN PATENT DOCUMENTS

CN         1860481 A     11/2006
CN       101185138 A      5/2008
(Continued)

OTHER PUBLICATIONS

Notification of Reason for Refusal issued by the Korean Patent Office Action dated Jun. 8, 2018, in counterpart Korean Patent Application No. 10-2017-7014170.
(Continued)

*Primary Examiner* — Gil H. Lee
(74) *Attorney, Agent, or Firm* — Finnegan, Henderson, Farabow, Garrett & Dunner, L.L.P.

(57) ABSTRACT

A method and device for displaying an audio cover are provided. The method includes receiving from a terminal an acquisition request that requests a target cover image. The method also includes acquiring the target cover image according to the acquisition request. The target cover image is at least one of a dynamic cover image and a static cover image corresponding to an audio file. The method further includes sending the target cover image to the terminal. The terminal is configured to display the target cover image.

22 Claims, 38 Drawing Sheets

(56) References Cited

U.S. PATENT DOCUMENTS

| | | | |
|---|---|---|---|
| 2014/0002484 A1* | 1/2014 | Lynch | G09B 5/062 |
| | | | 345/619 |
| 2014/0081796 A1 | 3/2014 | Cohen | |
| 2015/0127129 A1* | 5/2015 | Abuelsaad | G06T 13/205 |
| | | | 700/94 |
| 2015/0371426 A1* | 12/2015 | Levy | G06T 13/80 |
| | | | 345/473 |

FOREIGN PATENT DOCUMENTS

| | | |
|---|---|---|
| CN | 101206663 A | 6/2008 |
| CN | 101246412 A | 8/2008 |
| CN | 103457946 | 12/2013 |
| CN | 103457946 A | 12/2013 |
| CN | 104821929 A | 8/2015 |
| CN | 105159639 A | 12/2015 |
| EP | 3133509 A1 | 2/2017 |
| JP | H11-15993 A | 1/1999 |
| JP | 2002-91453 A | 3/2002 |
| JP | 2015-12322 A | 1/2015 |
| KR | 10-2006-0095556 A | 8/2006 |
| RU | 2460119 C2 | 8/2012 |

OTHER PUBLICATIONS

Decision on Granting a Patent for Invention issued by the Russian Patent and Trademark Office dated Jul. 26, 2018, in counterpart Russian Application No. 2016123942/08.

English Translation of Written Opinion of the International Search Report dated May 20, 2016, in counterpart International Application No. PCT/CN2015/100008.

English version of International Search Report of PCT Application No. PCT/CN2015/100008, dated May 20, 2016, issued by the ISA/CN—State Intellectual Property Office of the P.R. China.

International Search Report dated May 20, 2016, which was received in international application No. PCT/CN2015/100008 (5 pages).

First Office Action issued by the State Intellectual Property Office of the P.R. China. for Chinese Application No. 201510518879.3, dated Oct. 26, 2017.

Extended European Search Report issued in European application No. 16174625.0, dated Oct. 21, 2016 (39 pages).

* cited by examiner

METHOD AND DEVICE FOR DISPLAYING AUDIO PLAYBACK APPLICATION COVER

CROSS-REFERENCE TO RELATED APPLICATIONS

This application is based upon and claims priority to Chinese Patent Application No. 201510518879.3, filed on Aug. 21, 2015, the entire contents of which are incorporated herein by reference.

TECHNICAL FIELD

The present disclosure generally relates to the field of electronic technology applications and more particularly, to a method and device for displaying an audio playback application cover.

BACKGROUND

Along with the advance of science and technologies, audio playback Applications (Apps) are becoming widely used. Common audio playback Apps may include music playback Apps, music radio Apps or the like.

In related art, multiple audio playback application covers (also referred to as "audio cover" hereinafter) may be displayed on a display interface of an audio playback App installed in a terminal. The multiple audio playback application covers can serve as an entrance to access audio files. These audio covers may include pictures showing an album cover, a singer cover, and a song menu cover. After receiving a triggering instruction generated by a user clicking an audio cover, the terminal may display an audio file list corresponding to the audio cover for the user to click for playback.

SUMMARY

According to a first aspect of the embodiments of the present disclosure, a method for displaying an audio cover is provided. The method includes receiving from a terminal an acquisition request that requests a target cover image. The method also includes acquiring the target cover image according to the acquisition request. The target cover image is at least one of a dynamic cover image or a static cover image corresponding to an audio file. The method further includes sending the target cover image to the terminal. The terminal is configured to display the target cover image.

According to a second aspect of the embodiments of the present disclosure, a method for displaying an audio cover is provided. The method includes, when an audio cover is to be acquired, sending to a server an acquisition request that requests a target cover image. The server is configured to acquire the target cover image according to the acquisition request and the target cover image is at least one of a dynamic cover image or a static cover image corresponding to an audio file. The method also includes receiving the target cover image sent by the server, and when the audio cover is to be displayed, displaying the pre-acquired target cover image.

According to a third aspect of the embodiments of the present disclosure, a device for displaying an audio cover is provided. The device includes a processor and a memory configured to store an instruction executable by the processor. The processor is configured to receive from a terminal an acquisition request to a server that requests a target cover image. The server is configured to acquire the target cover image according to the acquisition request and the target cover image is at least one of a dynamic cover image or a static cover image corresponding to an audio file. The processor is also configured to receive the target cover image sent by the server. When the audio cover is to be displayed, the processor is further configured to display the pre-acquired target cover image.

According to a fourth aspect of the embodiments of the present disclosure, a device for displaying an audio cover is provided. The device includes a processor and a memory configured to store an instruction executable by the processor. When an audio cover is to be acquired, the processor is configured to send to a server an acquisition request that requests a target cover image. The server is configured to acquire the target cover image according to the acquisition request and the target cover image is at least one of a dynamic cover image or a static cover image corresponding to an audio file. The processor is also configured to receive the target cover image sent by the server. When the audio cover is to be displayed, the processor is further configured to display the pre-acquired target cover image.

It is to be understood that the above general description and detailed description below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
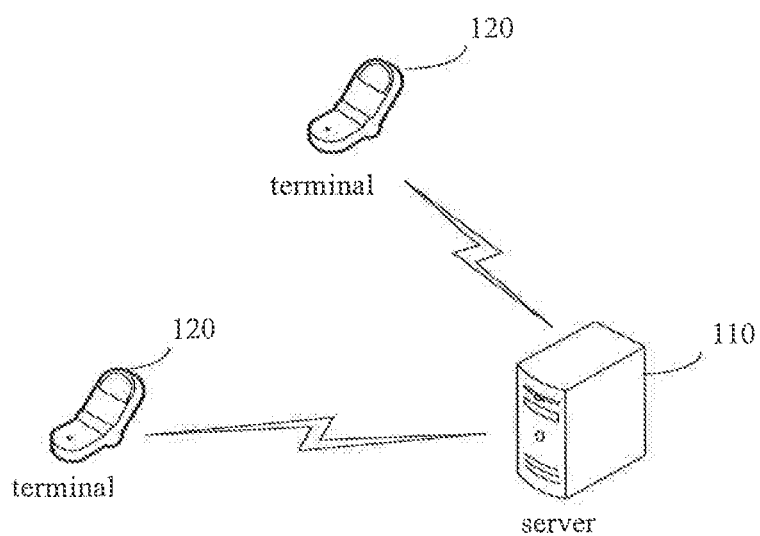
FIG. 1 is a schematic diagram illustrating an environment in which a method for displaying an audio cover is implemented, according to an exemplary embodiment.

FIG. 1 is a schematic diagram illustrating an environment in which a method for displaying an audio cover is implemented, according to some embodiments of the present disclosure. The environment includes a server 110 and at least one terminal 120.

The server 110 may be a server, or a server cluster including a plurality of servers, or a cloud computing service center. The terminal 120 may be a smart phone, a computer, a multimedia player, an electronic reader, wearable devices or the like.

A connection may be established between the server 110 and the terminal 120 through a wired network or a wireless network. An audio playback App for playing an audio file may be installed in the terminal 120. The server 110 may provide the audio file and information related to the audio file to the terminal 120.

In related art, an audio playback App may be installed in a terminal. Multiple audio covers may be displayed on a display interface of the audio playback App installed in the terminal. These audio covers may include pictures showing an album cover, a singer cover, and a song menu cover. These pictures are all static pictures displayed in a single form.

Figure 2:
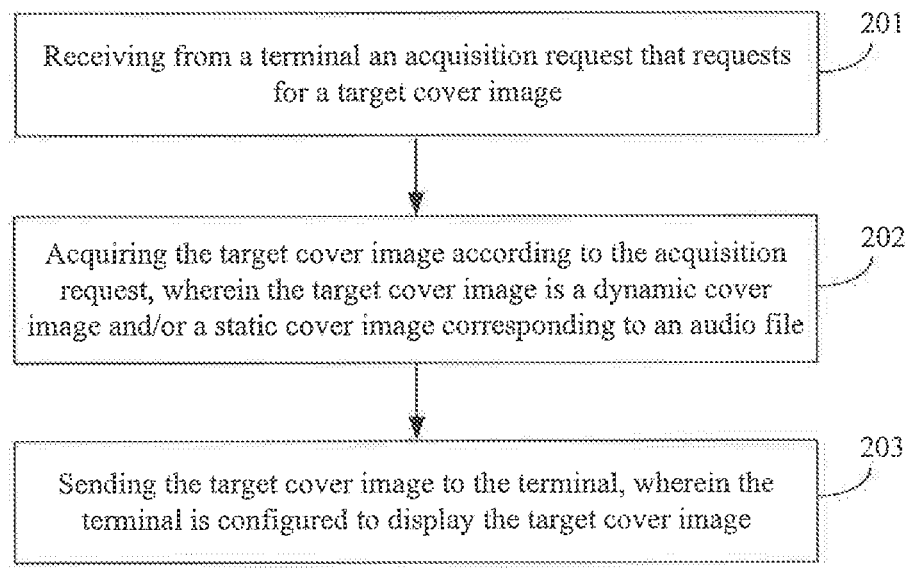
FIG. 2 is a flowchart showing a method for displaying an audio cover, according to an exemplary embodiment.

FIG. 2 is a flowchart showing a method for displaying an audio cover, according to an exemplary embodiment of the present disclosure. The method may be implemented by the server 110 shown in FIG. 1. The method includes the following steps:

In Step 201, an acquisition request that requests a target cover image is received from a terminal.

In Step 202, the target cover image according to the acquisition request is acquired. The target cover image is a dynamic cover image and/or a static cover image corresponding to an audio file.

In the disclosed embodiments, that the target cover image is a dynamic cover image and/or a static cover image corresponding to the audio file means that the target cover image is a dynamic cover image corresponding to an audio file, or that the target cover image is a static cover image corresponding to an audio file, or that the target cover image is a dynamic cover image and a static cover image which both correspond to the audio file.

In Step 203, the target cover image is sent to the terminal. The terminal is configured to display the target cover image.

As described above, according to the disclosed audio cover display methods, a server acquires a target cover image according to an acquisition request sent by a terminal, and provides the target cover image to the terminal. The terminal displays the target cover image. Because the target cover image is a dynamic cover image and/or a static cover image, forms of displaying an audio cover become versatile, and the audio cover may be displayed more flexibly.

Optionally, the step of acquiring the target cover image according to the acquisition request includes:

determining target audio data according to the acquisition request;

determining target scene information and a target static image according to the target audio data, wherein the target scene information is for representing a scene characteristic associated with the target audio data;

acquiring an auxiliary dynamic image associated with the target scene information; and processing the target static image using the auxiliary dynamic image to obtain the target cover image.

Optionally, the acquisition request includes target scene information that represents a scene characteristic of an environment where a terminal is located.

The step of acquiring the target cover image according to the acquisition request includes:

acquiring a target static image according to the acquisition request;

acquiring an auxiliary dynamic image associated with the target scene information; and processing the target static image using the auxiliary dynamic image to obtain the target cover image.

Optionally, the step of acquiring the auxiliary dynamic image associated with the target scene information includes:

querying a preset relationship between scene information and a dynamic image;

if there exists a dynamic image associated with the target scene information in the preset relationship between scene information and a dynamic image, determining the dynamic image associated with the target scene information as the auxiliary dynamic image; and if there exist at least two dynamic images associated with the target scene information in the preset relationship between scene information and a dynamic image, selecting a dynamic image from the at least two dynamic images associated with the target scene information as the auxiliary dynamic image according to a preset rule.

Optionally, the step of selecting a dynamic image from the at least two dynamic images associated with the target scene information as the auxiliary dynamic image according to a preset rule includes:

randomly selecting a dynamic image from the at least two dynamic images associated with the target scene information as the auxiliary dynamic image; or selecting a dynamic image that appears most times (i.e., most frequently) from the at least two dynamic images associated with the target scene information as the auxiliary dynamic image; or superposing the at least two dynamic images associated with the target scene information to form the auxiliary dynamic image; or providing the at least two dynamic images associated with the target scene information to the terminal, receiving a selection instruction sent by the terminal, wherein the selection instruction is for instructing a user to select a dynamic image from the at least two dynamic images associated with the target scene information, and determining the dynamic image selected by the user as the auxiliary dynamic image.

Optionally, the target scene information includes at least one of a season, a geographical location, a landmark, weather, mood, or time.

Optionally, the step of processing the target static image using the auxiliary dynamic image to obtain the target cover image includes:

superposing the auxiliary dynamic image on the target static image to obtain the target cover image; or replacing the target static image with the auxiliary dynamic image to obtain the target cover image; or combining the auxiliary dynamic image and the target static image to obtain the target cover image.

Optionally, the method further includes:

judging whether the auxiliary dynamic image associated with the target scene information is stored in the server; and if the auxiliary dynamic image is not stored in the server, determining the target static image acquired according to an acquisition request as the target cover image.

Optionally, the step of acquiring the target cover image according to the acquisition request includes:

determining target audio data according to the acquisition request; and determining, as the target cover image, a dynamic image that is acquired from a preset dynamic cover database and that corresponds to the target audio data, wherein the dynamic cover database is configured to record audio information. The audio information includes audio data and the dynamic image.

Optionally, the method further includes:

judging whether the dynamic image corresponding to the target audio data is stored in the dynamic cover database; and if the dynamic image corresponding to the target audio data is not stored in the dynamic cover database, determining the target static image acquired according to the acquisition request as the target cover image.

Optionally, the method further includes:

receiving newly added audio information, the newly added audio information including audio data and a static image;

determining scene information according to the audio data, wherein the scene information is for representing a scene characteristic associated with the audio data;

determining an auxiliary dynamic image associated with the scene information;

processing the static image using the auxiliary dynamic image to obtain a dynamic image;

updating the newly added audio information using the dynamic image to obtain updated audio information, the updated audio information including the audio data and the dynamic image; and storing the updated audio information in the preset dynamic cover database, wherein the audio information recorded in the preset dynamic cover database includes the dynamic image.

Optionally, the method further includes:

receiving newly added audio information, wherein the newly added audio information includes the dynamic image; and storing the newly added audio information in the preset dynamic cover database, wherein the audio information recorded in the preset dynamic cover database includes the dynamic image.

Optionally, the target cover image is obtained by superposing the auxiliary dynamic image on the target static image, and the method further includes sending a display parameter to the terminal, wherein the terminal is configured to set a display characteristic of the auxiliary dynamic image according to the display parameter and the display parameter includes at least one of transparency, a resolution, or an image position.

Optionally, the target cover image includes any one of a dynamic picture, a video, and dynamic display information. The dynamic display information includes a dynamic parameter and a static picture. The dynamic parameter indicates a changing characteristic of the display parameter during display of the static picture.

As described above, according to the disclosed audio cover display methods, a server acquires a target cover image according to an acquisition request sent by a terminal, and provides the target cover image to the terminal. The terminal displays the target cover image. Because the target cover image is a dynamic cover image and/or a static cover image, the display forms of the audio cover become versatile, and the audio cover may be displayed more flexibly.

Figure 3:
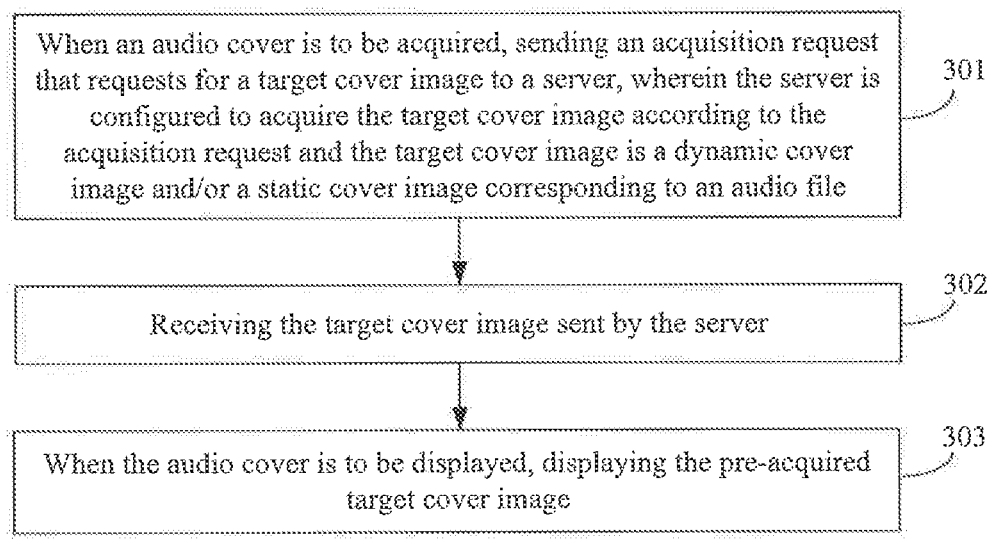
FIG. 3 is a flowchart showing a method for displaying an audio cover, according to an exemplary embodiment.

FIG. 3 is a flowchart showing a method for displaying an audio cover, according to an exemplary embodiment of the present disclosure. The method may be implemented by a terminal 120 shown in FIG. 1. The method includes the following steps:

In Step 301, when an audio cover is to be acquired, an acquisition request that requests a target cover image is sent to a server. The server is configured to acquire the target cover image according to the acquisition request. The target cover image is a dynamic cover image and/or a static cover image corresponding to an audio file.

In Step 302, the target cover image sent by the server is received.

In Step 303, when the audio cover is to be displayed, the pre-acquired target cover image is displayed.

As described above, according to the disclosed audio cover display methods, a server acquires a target cover image according to an acquisition request sent by a terminal, and provides the target cover image to the terminal. The terminal displays the target cover image. Because the target cover image is a dynamic cover image and/or a static cover image, display forms of the audio cover become versatile, and the audio cover may be displayed more flexibly.

Optionally, the step of displaying the pre-acquired target cover image includes displaying the pre-acquired target cover image in an image display area of a cover display interface of the terminal.

Optionally, the method further includes:

receiving at least two dynamic images provided by the server and associated with target scene information, wherein the target scene information represents a scene characteristic associated with target audio data, or, the target scene information represents a scene characteristic of an environment in which a terminal is located;

receiving a dynamic image selected by a user from the at least two dynamic images associated with the target scene information; and sending a selection instruction to the server, wherein the selection instruction includes the dynamic image selected by the user, and wherein the server is configured to determine the dynamic image selected by the user as an auxiliary dynamic image.

Optionally, the target cover image is obtained by superposing the auxiliary dynamic image on a target static image, and the method further includes:

receiving a display parameter sent by the server; and setting a display characteristic of the auxiliary dynamic image according to the display parameter, wherein the display parameter includes at least one of transparency, a resolution, or an image position.

Optionally, the target cover image includes any one of a dynamic picture, a video, and dynamic display information, wherein the dynamic display information includes a dynamic parameter and a static picture, and wherein the dynamic parameter indicates a changing characteristic of the display parameter during display of the static picture.

Optionally, displaying the pre-acquired target cover image includes:

detecting content of the target cover image; and if the target cover image includes the dynamic display information, displaying the static picture, and changing the characteristic of the display parameter during display of the static picture according to the dynamic parameter.

Optionally, the acquisition request includes target scene information, wherein the target scene information represents a scene characteristic of an environment in which a terminal is located.

The disclosed method further includes:

determining the target scene information through an App installed in the terminal and associated with the target scene information; or displaying scene information prompting options, and receiving target scene information selected by the user from the scene information prompting options; or displaying a scene information input box, and receiving target scene information input by the user in the scene information input box; or sending an information acquisition request to a function server having a target scene information determination function, and receiving target scene information sent by the function server.

Optionally, the target scene information includes at least one of a season, a geographical location, a landmark, weather, mood, or time.

As described above, according to the disclosed audio cover display methods, a server acquires a target cover image according to an acquisition request sent by a terminal, and provides the target cover image to the terminal, and the terminal displays the target cover image. Because the target cover image is a dynamic cover image and/or a static cover image, the display forms of the audio cover become versatile, and the audio cover may be displayed more flexibly.

Figure 4:
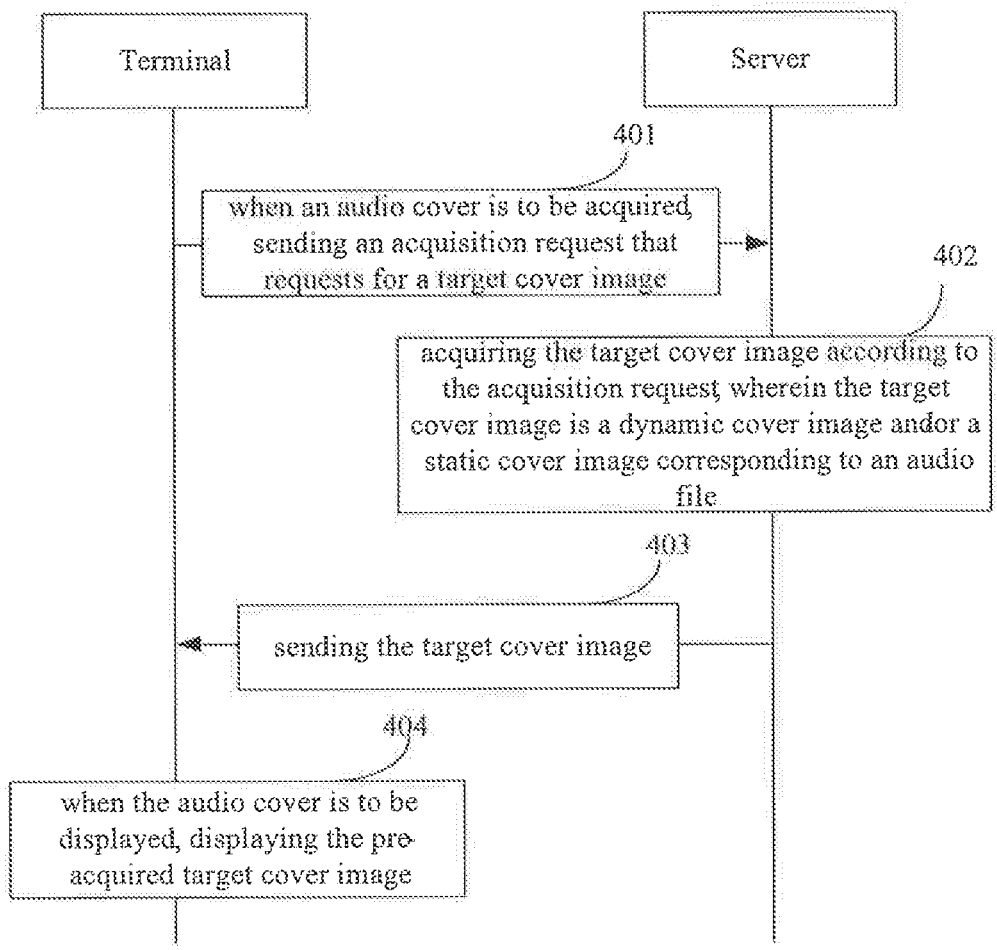
FIG. 4 is a flowchart showing a method for displaying an audio cover, according to an exemplary embodiment.

FIG. 4 is a flowchart showing a method for displaying an audio cover, according to an exemplary embodiment of the present disclosure. The method may be applied to the environment shown in FIG. 1. The method includes the following steps.

In Step 401, when an audio cover is to be acquired, a terminal sends an acquisition request to a server that requests a target cover image.

An audio playback App, such as a music player App, a radio App, or a music radio App, may be installed in the terminal. The audio playback App may be a system App of the terminal, or may also be an App downloaded by the terminal. When a user starts the audio playback App or searches for a related audio file through the audio playback App, or desires to access a preset App interface (such as a main interface of the App), the terminal needs to display a cover image. The terminal may send an acquisition request to the server that requests a target cover image to the server. The server is a backend server of the audio playback App. For example, the acquisition request may be a song menu cover acquisition request that requests a song menu cover image, and the target cover image may be a corresponding song menu cover image.

In Step 402, the server acquires the target cover image according to the acquisition request. The target cover image is a dynamic cover image and/or a static cover image corresponding to an audio file.

In Step 403, the server sends the target cover image to the terminal.

In Step 404, when the audio cover is to be displayed, the terminal displays the pre-acquired target cover image.

In the disclosed embodiments, the pre-acquired target cover image may be displayed in an image display area of a cover display interface on the terminal. A display form of another area (such as a text display area or a button display area) of the cover display interface on the terminal may be the same as that in the related art, and will not be limited in the disclosed embodiments.

Optionally, when the target cover image is a dynamic cover image, the target cover image may include at least one of the following: a dynamic picture, a video, or dynamic display information. The dynamic display information includes a dynamic parameter and a static picture. The dynamic parameter indicates a changing characteristic of a display parameter during display of the static picture. In the disclosed embodiments, the server may pre-establish a relationship between scene information and a dynamic image. The dynamic image may include at least one of a dynamic picture, a video, or dynamic display information. The dynamic picture may be a Graphics Interchange Format (GIF) picture. The GIF picture may be obtained by converting a video through image processing software such as PhotoShop®, or obtained by connecting a plurality of static pictures frame by frame through image processing software such as PhotoShop® or Adobe® After Effects®. The video may be a video in the format of avi, wmv, rm, rmvb, 3gp, mpg, mov, and the like. The dynamic display information may include a dynamic parameter and a static picture. The dynamic parameter indicates the changing characteristic of the display parameter during display of the static picture. The dynamic parameter may indicate the continuously changing value of the display parameter, such as a picture resolution, an image position, a scanning frequency of a display, or a refreshing rate of the display.

Optionally, in Step 402, multiple methods may be implemented by the server to acquire the target cover image according to the acquisition request. Exemplary embodiments of the present disclosure can be described with the following two aspects.

In the first aspect, the server may acquire the target cover image according to target scene information determined based on the acquisition request.

The target scene information may include at least one of the following: a season, a geographical location, a landmark, weather, mood, or time. Because there are different methods for acquiring target scene information, there may also be multiple methods for the server to acquire the target cover image according to the target scene information determined based on an acquisition request. Two example implementations (first example implementation and second example implementation) are described below.

Figure 5:
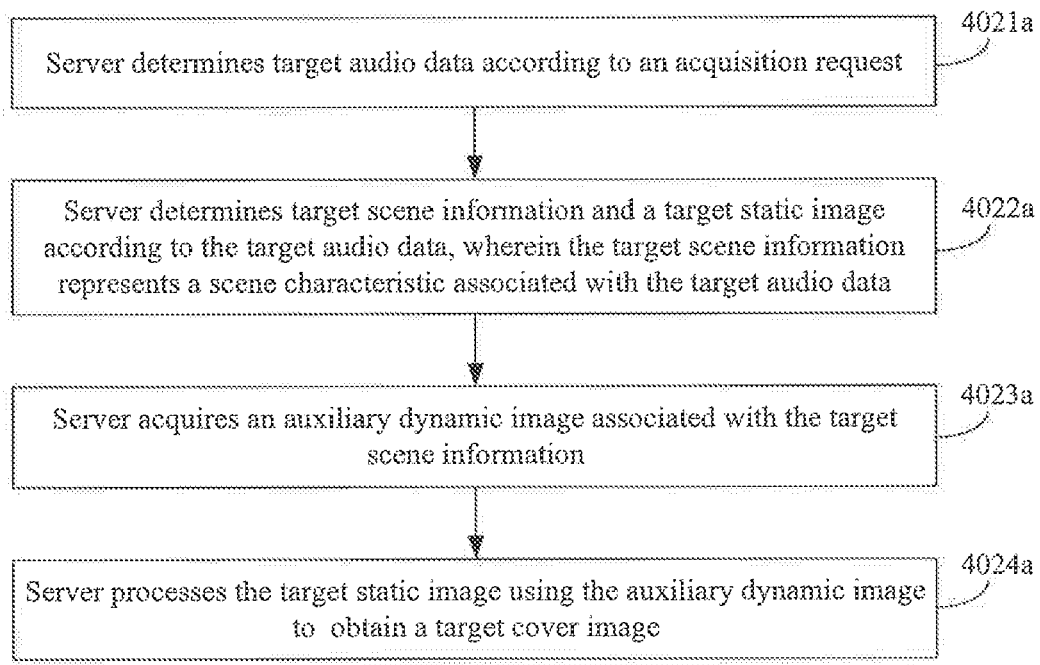
FIG. 5 is a flowchart showing a method for acquiring a target cover image according to an acquisition request, according to an exemplary embodiment.

The first example implementation is shown in FIG. 5, which is a flowchart showing a method for acquiring a target cover image according to an acquisition request, according to an exemplary embodiment of the present disclosure. As shown in FIG. 5, in the first example implementation, the method includes the following steps.

In Step 4021*a*, the server determines target audio data according to the acquisition request.

It is noted that the acquisition request includes different contents in different application scenes. The server may acquire corresponding target audio data using different methods according to the contents of the acquisition request. If the audio playback App is a music player App, when a user starts the music player App by a triggering gesture such as a clicking gesture, the music player App will display its main interface and at least one cover image on the main interface. The terminal sends the acquisition request to the server. In the meantime, the acquisition request causes the music player App to be started. For example, the acquisition request may use an identifier of the main interface to instruct the music player App to start. The server acquires preset audio data corresponding to the main interface and uses the acquired preset audio data as target audio data according to the acquisition request. The user inputs a keyword in a search box when searching for an audio file for playback through the search box of the audio playing App. The terminal sends the acquisition request to the server. The acquisition request includes the keyword. The server searches a corresponding database for at least one set of audio data matching the keyword, and determines the at least one set of audio data as the target audio data. When the user opens a preset interface (such as "discover music", "selected songs menu," or "my music") of the music player App through a triggering gesture such as a clicking gesture, the music player App displays its preset interface and at least one cover image on the preset interface. The terminal sends the acquisition request to the server. The acquisition request may cause the preset interface to be opened. For example, the acquisition request may use an identifier of the preset interface to instruct the preset interface to open. The server acquires preset audio data corresponding to the identifier of the preset interface and determines the acquired preset audio data as the target audio data according to the acquisition request. In some embodiments, an acquisition process of the target audio data may use corresponding related technology in the art, and will not be repeated in the present disclosure.

In some embodiments, when a user opens an interface where "my music" of a music player App is located through a triggering gesture, such as a clicking gesture, the music player App displays the interface where "my music" is located and at least one cover image on the interface where "my music" is located. The terminal sends an acquisition request to the server. The acquisition request uses an identifier of "my music" to instruct the preset interface to open. The server acquires audio data related to "classical songs of WANG Fei" corresponding to the identifier of "my music."

In some embodiments, the acquisition request may further include a username and a password of the user. The server authenticates the user according to the username and the password, and then executes the acquisition process of the target audio data when determining that the user has a corresponding authority. An authentication process may use any known technology in the art, and will not be repeated in the present disclosure.

In Step 4022*a*, the server determines target scene information and a target static image according to the target audio data. The target scene information represents a scene characteristic associated with the target audio data.

In one aspect, the server may determine the target scene information according to the target audio data.

In the disclosed embodiments, the target scene information may represent the scene characteristic associated with the target audio data. The scene characteristic may reflect some characteristics of the target audio data. For example, the target scene information may include at least one of the following: season, a geographical location, a landmark, weather, mood, or time. The season may include spring, summer, autumn, winter. The geographical location may include a manually divided region, such as Beijing and Shanghai, or a characteristic natural area such as a sea, a lake, and grassland. The landmark may include an object, such as Pearl of the Orient, ice, snow, the moon, and stars. The weather may include windy weather, stormy weather, foggy weather, rainy weather and the like. The mood may be happiness, sadness, and the like. The time may include early morning, evening, and the like. The target scene information is only schematically described in the disclosed embodiments, and other apparent examples shall also fall within the scope of the embodiments of the present disclosure.

In the disclosed embodiments, the target scene information may be determined by analyzing description information of an audio file. For example, because the description information of the audio file may include related information such as the name, lyrics, and source of the audio file, or may be in a text format such as a "txt" format, a scene characteristic related to the description information may be determined by text analysis. The scene characteristic serves as the target scene information. Alternatively or additionally, the target scene information may also be determined by analyzing content of the audio file being played. For example, the mood reflected by the audio file being played may be determined by analyzing the playing rhythm of the audio file. In some embodiments, the mood reflected by the audio file may be determined to be happiness if the rhythm is faster. In some embodiments, each piece of audio data may be classified in advance according to the types of the target scene information. The type of the target audio data may be used as the target scene information. For example, if the type of a target audio file is a "sad love song", the target scene information may be determined to be "sadness".

In some embodiments, because the target audio data include at least one audio file, there may be multiple methods for determining target scene information according to the target audio data. If the target audio data includes one audio file, a scene characteristic associated with the audio file may serve as the target scene information. The scene characteristic associated with the audio file may be determined according to description information of the audio file. If the target audio data includes at least two audio files, a scene characteristic associated with the at least two audio files may be determined according to a preset rule. The scene characteristic associated with the at least two audio files serve as the target scene information. In some embodiments, the preset rule may include randomly selecting one audio file from the at least two audio files and determining a scene characteristic associated with the selected audio file as the scene characteristic associated with the at least two audio files. The preset rule may also include determining scene characteristics associated with each of the at least two audio files and determining the scene characteristic that appears most times (i.e., most frequently) in the scene characteristics associated with the at least two audio files as the target scene information. The preset rule may also include determining preset scene information that describes the at least two audio files as the target scene information. The scene information that describes the at least two audio files may be determined by overall description information of the at least two audio files. The preset rule may also include sorting the at least two audio files according to a preset sequencing rule, selecting the audio file at a preset position (such as the first audio file) from the sorted audio files and determining the scene characteristic associated with the selected audio file as the scene characteristic associated with the at least two audio files.

In some embodiments, assuming that the audio data determined according to the acquisition request is "classical songs of Wang Fei," if the audio data includes one audio file, such as "That year a hurry," the scene information may be determined to include: "winter," "ice," and "spring" according to description information such as the lyrics of "That year a hurry." If the audio data includes at least two audio files such as "That year a hurry," "Love Peas," and "Fleeting Time," then the scene information may be determined according to overall description information of the at least two audio files. If the overall description information is: classical songs of Wang Fei, being capable of moving one's heart, being as quiet as lakes, and sometimes being as blue as the sky, the scene information may be determined to include "lake" based on text analysis.

In another aspect, the server may determine a target static image according to target audio data.

In some embodiments, the server may establish a static cover database configured to store audio related information. When newly added audio information is acquired, the newly added audio information may include audio data and a static image. In related art, the static image is determined as an audio cover corresponding to the audio data. Such a single display lacks versatility. In the disclosed embodiments, the server may process the static image stored in the static cover database.

In some embodiments, each piece of audio information stored in the static cover database may, as shown in Table 1, include audio data and a static image. The audio data may include description information of an audio file, playing data of the audio file, and the like. The description information of the audio may include related information such as the name, lyrics, and source of the audio file, and may be in a text format such as the "txt" format. The playing data of the audio file may include the actual audio data, which may be in a suitable audio format such as WAV and mp3. The playing data of the audio file may include at least one audio file, or a set of multiple audio files. If the playing data of the audio file includes a set of multiple audio files, the description information of the audio file may be the overall description information of the set of the multiple audio files, or may be the description information of each audio file. The static image is typically a preset static picture.

In some embodiments, the audio information stored in the static cover database includes song menu information. Each piece of audio information may include song menu data and a static image. The song menu data may include description information of a song menu, playing data of the song menu, and the like. The description information of the song menu may include related information such as name, representative songs, and source of the song menu. The playing data of the song menu includes an audio file of each song in the song menu, and thus includes a set of multiple audio files. In some embodiments, the description information of the song menu may be "one singer one signature song", "it is sunny on Valentine's day, it rains suddenly . . . ," and the source "xx music", wherein "xx music" is a server name corresponding to the audio playback App that provides "one singer one signature song." Each piece of audio information may be provided with a unique identifier that facilitates searching for the audio information. Each static image may also be provided with a unique identifier that facilitates searching for the static image. The unique identifiers of the static images are not marked in Table 1. In some embodiments, as shown in Table 1, audio data included in audio information with an identifier 100 is an audio set "classical songs of Wang Fei," and a static image is the head portrait of Wang Fei.

TABLE 1

| Audio information | | |
|---|---|---|
| Audio data | Static image | Identifier |
| Audio set "classical songs of Wang Fei" | Head portrait of Wang Fei | 100 |
| Audio set "classical songs of Xie Tingfeng" | Head portrait of Xie Tingfeng | 101 |

TABLE 1-continued

Audio information

| Audio data | Static image | Identifier |
|---|---|---|
| Audio set "slow songs" | Static picture of slow songs | 102 |
| Audio set "one singer one signature song" | Static picture of sea | 103 |
| Audio set "old love songs" | Static picture of flowers | 104 |

In the disclosed embodiments, the corresponding target audio data may be acquired from the static cover database according to the acquisition request. The static image associated with the target audio data may be acquired according to the target audio data. When the server stores the target audio data in the static cover database in the form of the audio information shown in Table 1, the static image that is in the same audio information as the target audio data may be determined as the target static image. In some embodiments, there may also be multiple methods for acquiring the target static image. For example, a static image database may be configured to store audio related pictures randomly acquired from a network. A static image may be acquired from the static image database according to the acquisition request. A corresponding relationship between the audio data and the static image may also be established. The audio data and the static image may be stored separately. After the target audio data is determined, the corresponding relationship between the audio data and the static image is queried to obtain the target static image corresponding to the target audio data. These embodiments are exemplary only. Other apparent embodiments may also fall within the scope of the present disclosure.

In Step 4023a, the server acquires an auxiliary dynamic image associated with the target scene information.

Figure 6:
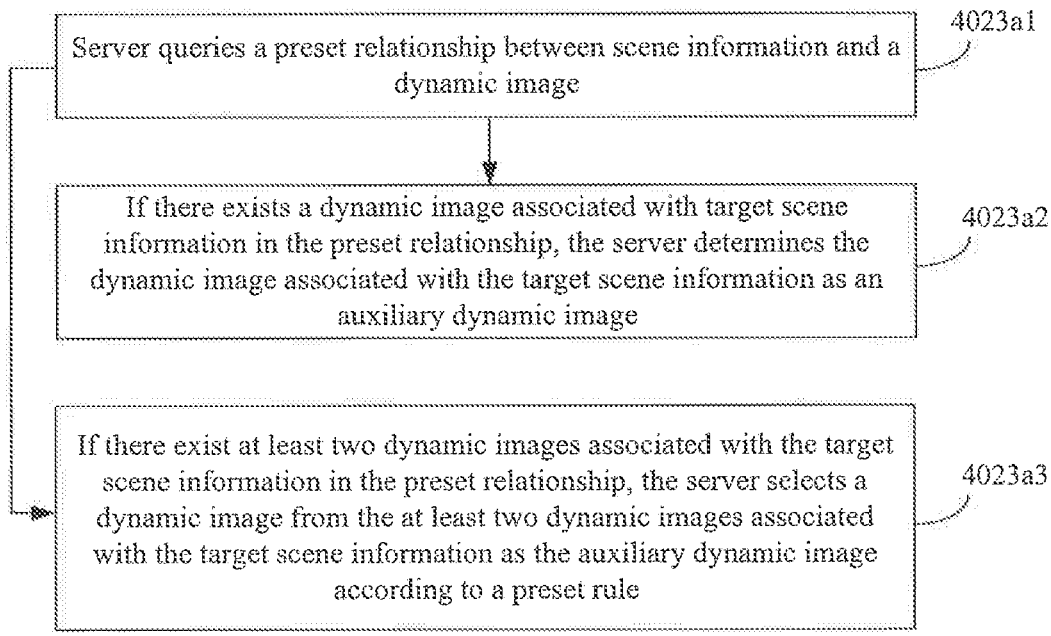
FIG. 6 is a flowchart showing a method for acquiring an auxiliary dynamic image associated with target scene information, according to an exemplary embodiment.

FIG. 6 is a flowchart showing a method for acquiring an auxiliary dynamic image associated with target scene information, according to an exemplary embodiment of the present disclosure. The method includes the follow steps.

In Step 4023a1, the server queries a preset relationship between scene information and a dynamic image.

In the disclosed embodiments, the server may pre-establish the relationship between scene information and a dynamic image. The dynamic image may include at least one of a dynamic picture, a video, or dynamic display information. The dynamic picture may be a GIF picture obtained by converting a video through image processing software such as PhotoShop®, or obtained by connecting a plurality of static pictures frame by frame through image processing software such as PhotoShop® or Adobe® After Effects®. The video may be a video in a format of avi, wmv, rm, rmvb, 3gp, mpg, mov, or the like. The dynamic display information may include a dynamic parameter and a static picture. The dynamic parameter indicates the changing characteristic of the display parameter during display of the static picture. The dynamic parameter may indicate a continuously changing value of the display parameter, such as a picture resolution, an image position, the scanning frequency of the display, or the refreshing rate of the display. By adjusting the display parameter of the static picture according to the dynamic parameter, a dynamic display effect may be achieved when the static picture is displayed, thereby presenting a dynamic image to the user.

Figure 7:
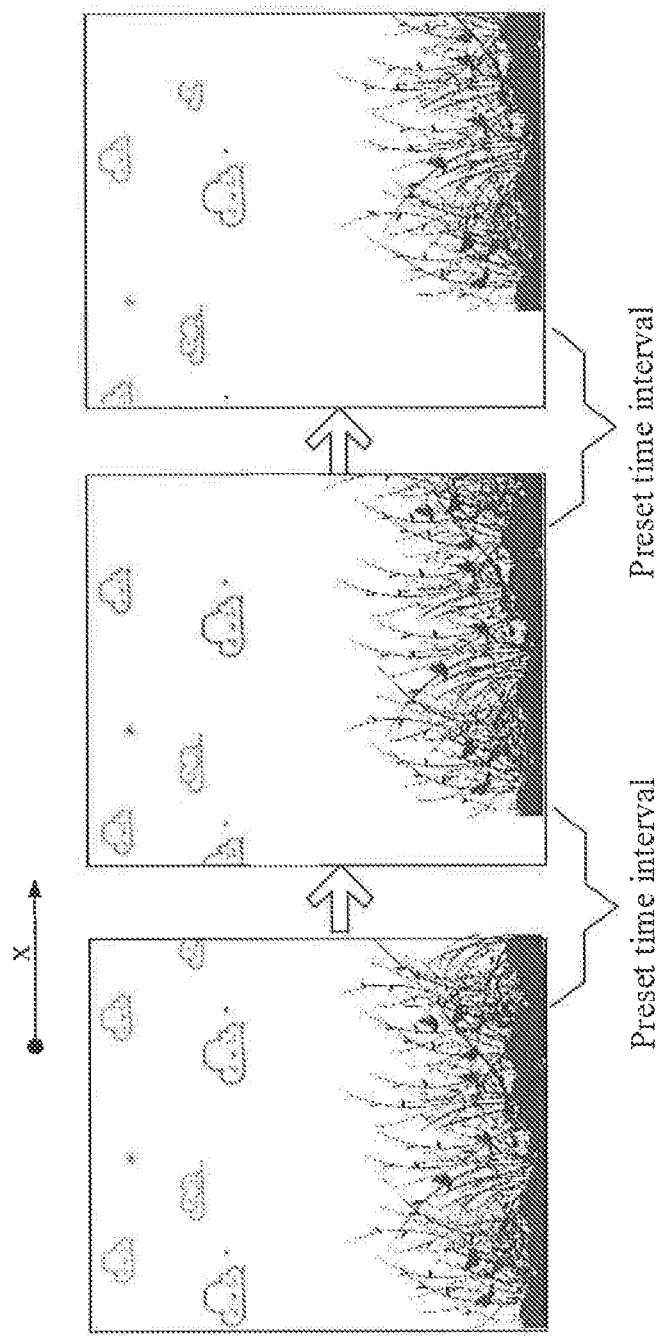
FIG. 7 is a display image showing continuous change of a static picture, according to an exemplary embodiment.

In some embodiments, assuming that the dynamic parameter is a continuously changing value of the image position, and images of two objects, e.g., grass and cloud, appear in the static picture, the dynamic parameter can indicate that a position of the grass continuously changes on the display interface of the terminal along a grid line scanning direction and that a position of the cloud continuously changes on the display interface of the terminal along a direction opposite to the grid line scanning direction. FIG. 7 is a display image showing continuous change of a static picture, according to an exemplary embodiment of the present disclosure. As shown in FIG. 7, display images of the same static picture at three continuous adjacent time points are used as an example. A display time interval between every two display images has a preset time length, which may be a suitable time length, such as 0.2 second. The dynamic display effect may be achieved by rapidly and periodically displaying the three display images on the display interface of the terminal. The grid line scanning direction is the left-to-right direction x in FIG. 7.

It is noted that using the dynamic display information to display the audio cover is just one exemplary method for dynamically displaying a static image. There are many other methods for dynamically displaying a static image. For example, in some embodiments, the server may instruct the terminal to display the audio cover using an animation technology. The animation technology refers to a technology of moving a picture or a part of the picture displayed on the display interface according to a certain rule or requirement. There are usually three methods for movement on the display interface, i.e., keeping the position unchanged and changing the form, keeping the form unchanged and changing the position, and changing both the position and the form. For example, in the animation technology, using a picture object array, a series of images related to continuous actions may be stored in a memory to achieve rapid transformation of the images. The picture object array may be provided to the terminal by the server. Various methods known in the related art may be used, which will not be repeated in the present disclosure.

The relationship between scene information and a dynamic image according to an exemplary embodiment is shown in Table 2. Each dynamic image may correspond to a piece of scene information. For example, "Green grass swings" may correspond to "spring." In some embodiments, each dynamic image may also correspond to multiple pieces of scene information. For example, "snow dances" may correspond to "winter," "ice," and "snow." Each dynamic image may be correspondingly provided with a unique identifier that facilities searching. For example, an identifier of the dynamic image "green grass swings" is 00.

TABLE 2

| Scene information | Dynamic image | Identifier |
|---|---|---|
| Spring | Green grass swings | 00 |
| Summer | Petals fall down | 01 |
| Autumn | Maple leaves fall down | 02 |
| Winter | Snow dances | 03 |
| Ice | Snow dances | 03 |
| Snow | Snow dances | 03 |
| Morning | Misty | 04 |

In Step 4023a2, if there exists a dynamic image associated with the target scene information in the preset relationship, the server determines the dynamic image associated with the target scene information as the auxiliary dynamic image.

In some embodiments, if the scene information is "spring," there exists a dynamic image "green grass swings" associated with "spring" according to the preset relationship between scene information and a dynamic image, as shown in Table 2. The "green grass swings" may be determined as an auxiliary dynamic image.

In Step 4023a3, if there exist at least two dynamic images associated with the target scene information in the preset relationship, the server selects a dynamic image from the at least two dynamic images associated with the target scene information as the auxiliary dynamic image according to a preset rule.

In the disclosed embodiments, there may be multiple preset rules. For example, the server selects a dynamic image from the at least two dynamic images associated with the target scene information as the auxiliary dynamic image according to the preset rule. The selection may include: randomly selecting a dynamic image from the at least two dynamic images associated with the target scene information as the auxiliary dynamic image; or, selecting the dynamic image that appears most times (i.e., most frequently) from the at least two dynamic images associated with the target scene information as the auxiliary dynamic image; or, superposing the at least two dynamic images associated with the target scene information to form the auxiliary dynamic image; or, selecting the auxiliary dynamic image from the at least two dynamic images associated with the target scene information as designated by the user.

In some embodiments, if the target audio data determined according to the acquisition request is "classical songs of Wang Fei," and if according to Table 2, the determined scene information is "winter," "ice," and "spring," respectively, and dynamic images associated with the scene information are "snow dances," "snow dances," and "green grass swings," respectively, then there exist at least two dynamic images associated with the scene information. A dynamic image associated with the scene information may be selected from the at least two dynamic images associated with the scene information as the auxiliary dynamic image according to the preset rule. For example, the preset rule may include randomly selecting a dynamic image associated with the scene information, such that a target dynamic image may be randomly selected from "snow dances," "snow dances," and "green grass swings," as the auxiliary dynamic image. As another example, the preset rule may include selecting the dynamic image that appears most times (i.e., most frequently) and is associated with the target scene information. For example, "snow dances" appears twice and "green grass swings" appears once. So, "snow dances" may be selected from "snow dances," "snow dances," and "green grass swings" as the auxiliary dynamic image.

Figure 8:
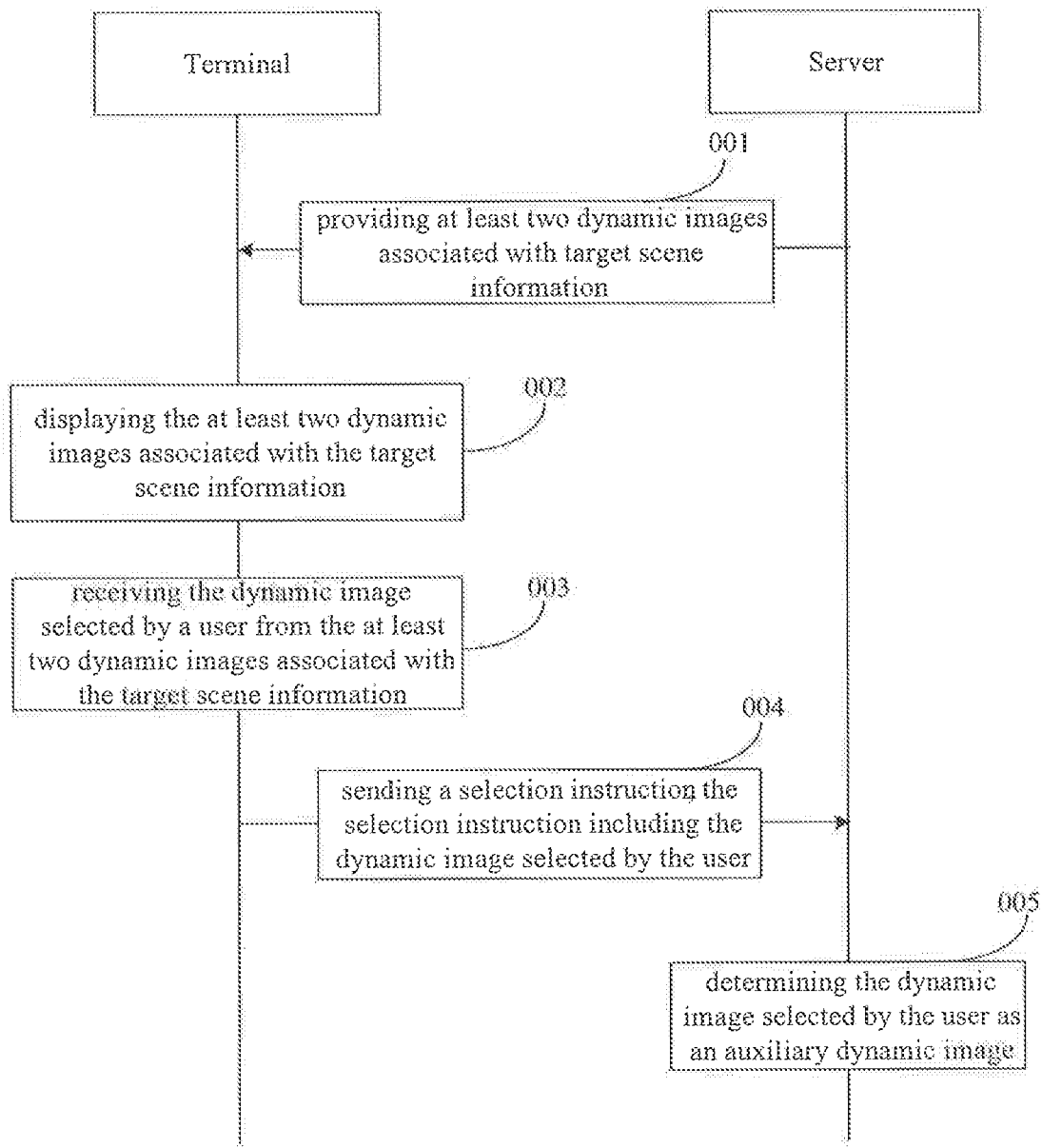
FIG. 8 is a flowchart showing a method for selecting an auxiliary dynamic image by a user, according to an exemplary embodiment.

In some embodiments, FIG. 8 is a flowchart showing a method for selecting an auxiliary dynamic image by a user, according to an exemplary embodiment. As shown in FIG. 8, the method includes the following steps.

In Step 001, the server provides the at least two dynamic images associated with the target scene information to the terminal.

In some embodiments, if the acquisition request contains an audio file identifier and the audio file identifier is the name "That year a hurry" of the audio file, then according to the lyrics "embrace each other for winter sleep, but not become immortal," "do not blame cold weather making tears into ice," and "spring breeze cannot recover old times," and as shown in Table 2, the scene information is "winter," "ice," and "spring." The dynamic images associated with the scene information are "snow dances," "snow dances," and "green grass swings," respectively. Therefore, there exist at least two dynamic images associated with the scene information. A dynamic image may be selected from the at least two dynamic images associated with the scene information as the auxiliary dynamic image according to the preset rule. The server may provide the two dynamic images "snow dances" and "green grass swings" to the terminal.

In Step 002, the terminal displays the at least two dynamic images associated with the target scene information.

In some embodiments, the two dynamic images "snow dances" and "green grass swings" may be displayed.

In Step 003, the terminal receives the dynamic image selected by the user from the at least two dynamic images associated with the target scene information.

If the user selects the dynamic image "green grass swings" from the two dynamic images "snow dances" and "green grass swings," the terminal receives the information selected by the user correspondingly.

In Step 004, the terminal sends a selection instruction to the server. The selection instruction includes the dynamic image selected by the user.

In some embodiments, the terminal may send the selection instruction to the server. The selection instruction includes the dynamic image "green grass swings" selected by the user.

In Step 005, the server determines the dynamic image selected by the user as the auxiliary dynamic image.

In some embodiments, the server may determine the dynamic image "green grass swings" selected by the user as the auxiliary dynamic image.

In Step 4024a, the server processes the target static image using the auxiliary dynamic image to obtain the target cover image.

Figure 9:
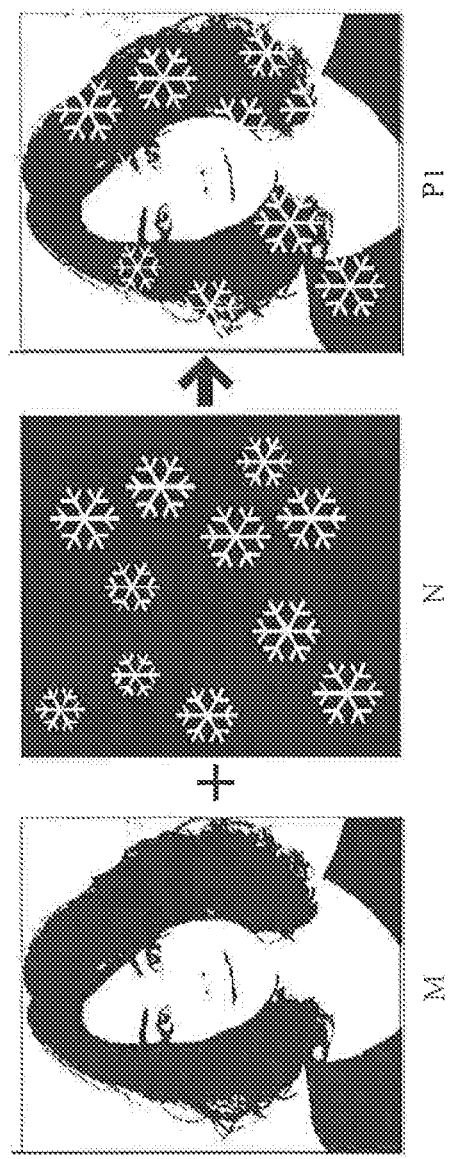
FIG. 9 is a schematic illustration of a method for obtaining a target cover image by processing a target static image using an auxiliary dynamic image, according to an exemplary embodiment.

FIG. 9 is a schematic illustration of a method for processing a target static image using an auxiliary dynamic image to obtain a target cover image, according to an exemplary embodiment of the present disclosure. As shown in FIG. 9, the auxiliary dynamic image may be superposed on the target static image to obtain the target cover image. For example, if the auxiliary dynamic image is a dynamic picture N displaying the dynamic image "snow dances," the target static image is a static picture M displaying the head portrait of Wang Fei, dynamic picture N is superposed on static picture M to obtain a dynamic picture P1. The dynamic picture P1 displays a scene where snow dances on the head portrait of Wang Fei, and the dynamic picture P1 is determined as the target cover image.

Figure 10:
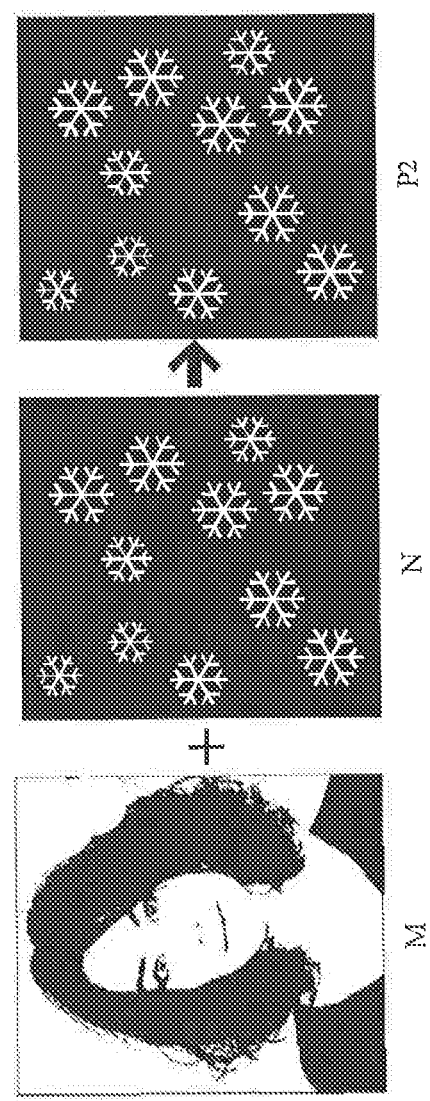
FIG. 10 is a schematic illustration of a method for obtaining a target cover image by processing a target static image using an auxiliary dynamic image, according to another exemplary embodiment.

FIG. 10 is a schematic illustration of a method for processing a target static image using an auxiliary dynamic image to obtain a target cover image, according to another exemplary embodiment of the present disclosure. As shown in FIG. 10, the target static image is replaced with the auxiliary dynamic image to obtain the target cover image. For example, if the auxiliary dynamic image is the dynamic picture N displaying the dynamic image "snow dances," the target static image is the static picture M displaying the head portrait of Wang Fei, static picture M may be covered by dynamic picture N to obtain a dynamic picture P2. Static picture M may also be replaced with dynamic picture N to obtain the dynamic picture P2. The dynamic picture P2 displays the scene "snow dances" to achieve a display effect that is the same as that of the dynamic picture N. The dynamic picture P2 is determined as the target cover image.

Figure 11:
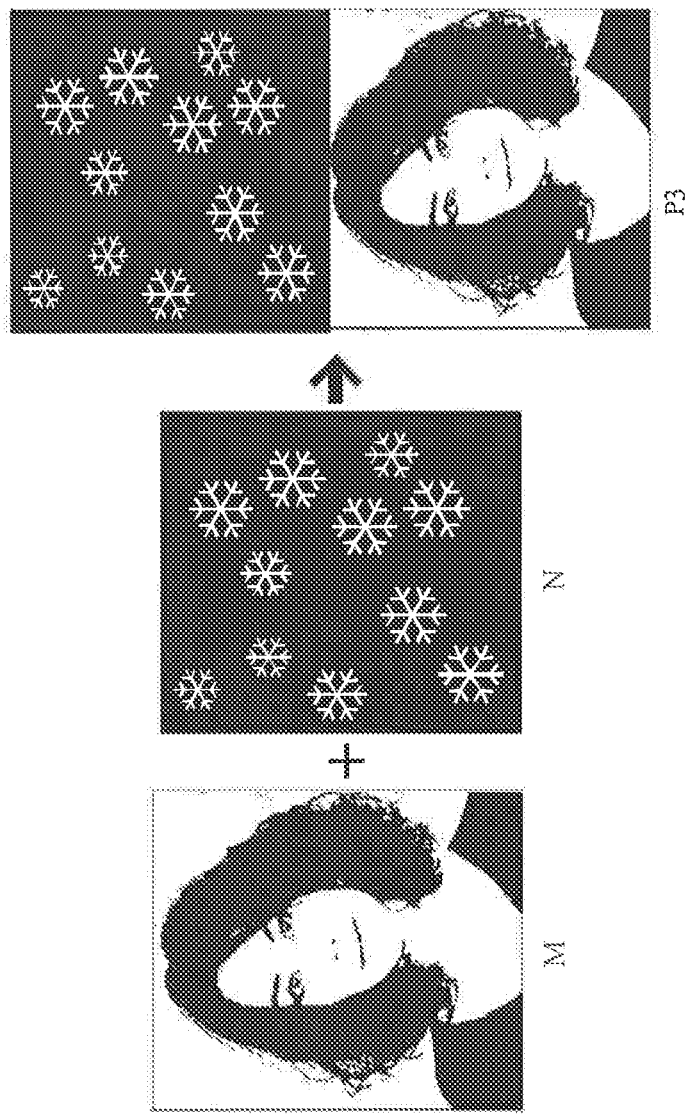
FIG. 11 is a schematic illustration of a method for obtaining a target cover image by processing a target static image using an auxiliary dynamic image, according to another exemplary embodiment.

FIG. 11 is a schematic illustration of a method for processing a target static image using an auxiliary dynamic image to obtain a target cover image, according to another exemplary embodiment of the present disclosure. As shown in FIG. 11, the auxiliary dynamic image and the target static image are combined to obtain the target cover image. For example, if the auxiliary dynamic image is the dynamic picture N displaying the dynamic image "snow dances," the target static image is the static picture M displaying the head portrait of Wang Fei, dynamic picture N may be combined with static picture M to obtain a dynamic picture P3. For example, dynamic picture N is arranged above static picture M to obtain the dynamic picture P3. The dynamic picture P3 simultaneously displays the head portrait of Wang Fei and the scene "snow dances." The dynamic picture P3 is determined as the target cover image.

As described above, in the disclosed embodiments, because the target static image is processed using the auxiliary dynamic image to obtain the target cover image, and the auxiliary dynamic image is determined through the target scene information representing the scene characteristic associated with the target audio data, the finally obtained target cover image may reflect the scene characteristic associated with the target audio data. Accordingly, display forms of the audio cover become versatile, and display becomes more interesting. In addition, audio cover functions as a prompting to a user. In some embodiments, the target lock screen interface may also include a dynamic scene, such as raindrops, petals falling down, snowing, and light flashing, so that the audio cover may be displayed more interestingly.

In the second example implementation, the acquisition request includes target scene information. The target scene information may represent a scene characteristic of an environment in which a terminal is located. The target scene information may include at least one of the following: season, a geographical location, a landmark, weather, mood, or time. The target scene information is acquired by the terminal and added into the acquisition request.

In some embodiments, the terminal may determine target scene information through an App installed in the terminal and associated with the target scene information. In some embodiments, the season and the time may be determined through a timing module or a timing App installed in the terminal. The weather may be determined through a weather App installed in the terminal. In some embodiments, the terminal displays scene information prompting options and receives the target scene information selected by the user from the scene information prompting options. For example, the terminal displays the scene information prompting options, such as a season prompting option, a geographical location prompting option, a landmark prompting option, a weather prompting option, a mood prompting option and a time prompting option, respectively. After receiving a mood prompting option triggering instruction from the user if the user selects the mood prompting option, the terminal displays sub-options of the mood prompting option, such as sub-options of happiness, sadness, depression and ecstasy. The terminal determines "happiness" as the target scene information after receiving a happiness sub-option triggering instruction from the user if the user selects the happiness sub-option in the sub-options. In some embodiments, the terminal displays a scene information input box, and receives target scene information input by the user in the scene information input box. For example, the terminal determines "happiness" as the target scene information if the terminal receives a character "happiness" input by the user in the displayed information input box. In some embodiments, the terminal sends an information acquisition request to a function server having a target scene information determination function, and receives the target scene information sent by the function server. The function server may be the same as or different from the server 110 shown in FIG. 1. In some embodiments, the terminal may send an information acquisition request for acquiring a geographical location to a server with a positioning function, such as a positioning server. The positioning server locates the terminal and sends the determined geographical location information to the terminal as the target scene information.

In some embodiments, the geographical location and the landmark may be determined through a map App installed in the terminal. Additionally or alternatively, the geographical location and the landmark may be determined by analyzing a picture taken by a camera provided in the terminal. The embodiments described above are only exemplary. Other apparent embodiments may also fall within the scope of the present disclosure.

Figure 12:
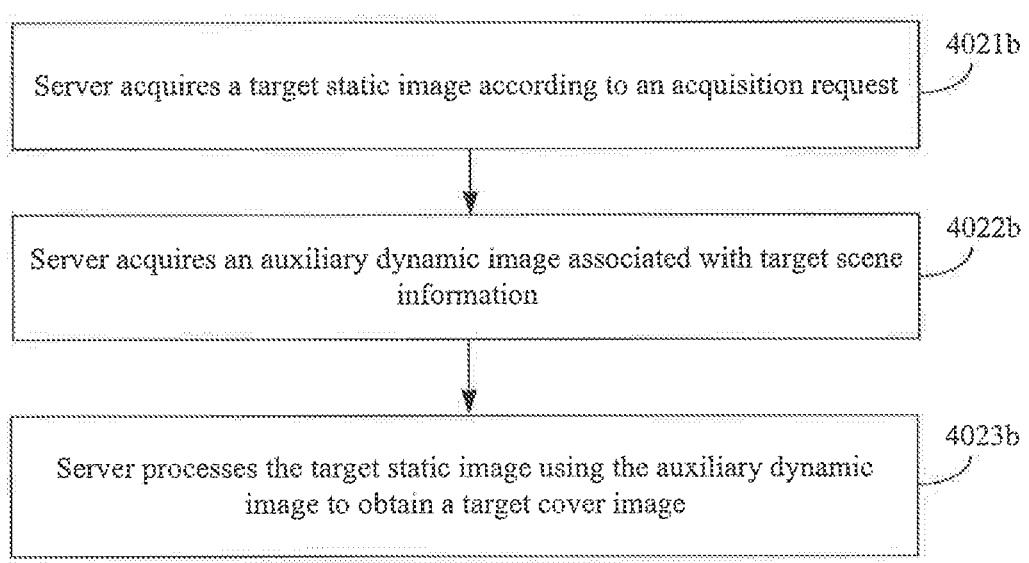
FIG. 12 is a flowchart showing a method for acquiring a target cover image according to an acquisition request, according to another exemplary embodiment.

FIG. 12 is a flowchart showing a method for acquiring a target cover image according to an acquisition request, according to another exemplary embodiment of the present disclosure. As shown in FIG. 12, the method includes the following steps.

In Step 4021*b*, the server acquires a target static image according to an acquisition request.

In some embodiments, the server may establish a static cover database configured to store audio related information. When newly added audio information is acquired, the newly added audio information may include audio data and a static image. In the related art, the static image may be determined as an audio cover corresponding to the audio data. Such a display format lacks versatility.

In the disclosed embodiments, the corresponding target audio data may be acquired from the static cover database according to the acquisition request. Such an acquisition process may refer to Step 4021*a* (FIG. 5). The static image associated with the target audio data is acquired according to the target audio data. When the server stores the target audio data into the static cover database in the form of the audio information shown in Table 1, the static image that is in the same audio information as the target audio data may be determined as the target static image. For example, the target audio data "classical songs of Wang Fei" may be acquired according to the acquisition request, and the target static image acquired according to the target audio data "classical songs of Wang Fei" may be the head portrait of Wang Fei.

In Step 4022*b*, the server acquires an auxiliary dynamic image associated with the target scene information.

Figure 13:
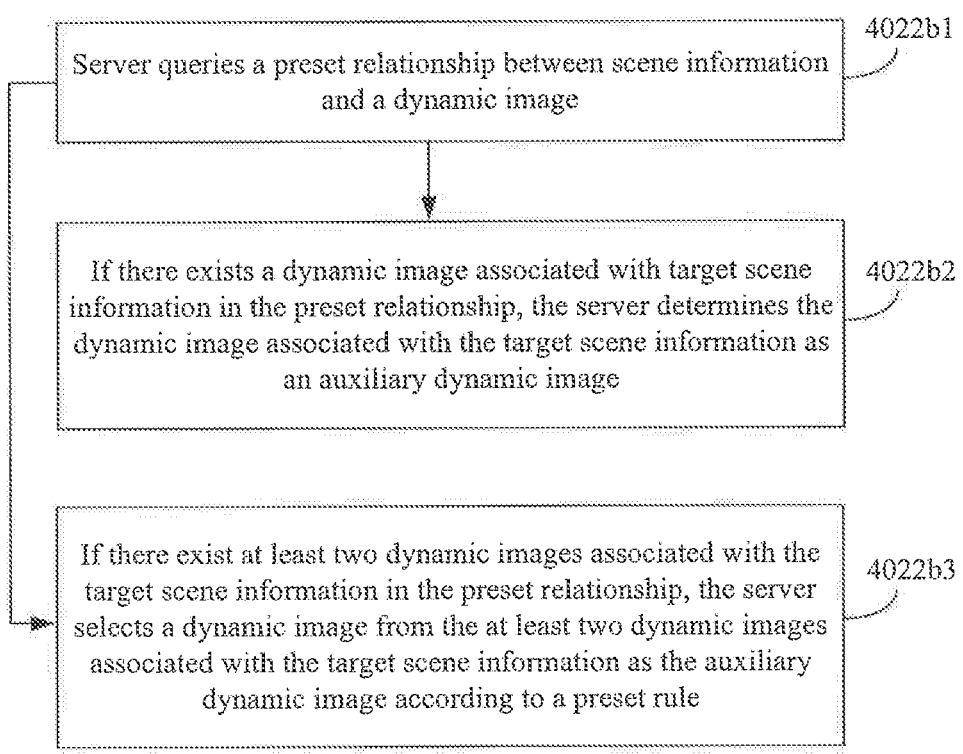
FIG. 13 is a flowchart showing a method for acquiring an auxiliary dynamic image associated with target scene information, according to another exemplary embodiment.

FIG. 13 is a flowchart showing a method for acquiring an auxiliary dynamic image associated with target scene information, according to an exemplary embodiment of the present disclosure. The method includes the following steps.

In Step 4022*b*1, the server queries a preset relationship between scene information and a dynamic image.

In the disclosed embodiments, a process of querying the preset relationship between scene information and a dynamic image by the server may refer to Step 4023*a*1 in the above-mentioned embodiment.

In Step 4022*b*2, if there exists a dynamic image associated with the target scene information in the preset relationship, the server determines the dynamic image associated with the target scene information as an auxiliary dynamic image.

For example, if the scene information is "spring," then there exists a dynamic image "green grass swings" associated with "spring" according to the preset relationship, as shown in Table 2, and "green grass swings" is determined as the auxiliary dynamic image.

In Step 4022*b*3, if there exist at least two dynamic images associated with the target scene information in the preset relationship, the server selects a dynamic image from the at least two dynamic images associated with the target scene information as the auxiliary dynamic image according to a preset rule.

For example, the target scene information in the acquisition request is "spring" and "morning," and according to Table 2, the dynamic images associated with the scene information are "green grass swings" and "misty," respectively. Accordingly, there exist at least two dynamic images associated with the scene information. A dynamic image associated with the scene information may be selected from the at least two dynamic images associated with the scene information as the auxiliary dynamic image according to the preset rule. For example, the preset rule may include randomly selecting a dynamic image associated with the scene information, so that a target dynamic image may be randomly selected from "green grass swings" and "misty" as the auxiliary dynamic image. As another example, the preset rule may include superposing the dynamic images associated with the target scene information to form an auxiliary dynamic image, so that "green grass swings" and "misty" may be superposed to form the auxiliary dynamic image.

A process implemented by a server to select a dynamic image from the at least two dynamic images associated with the scene information as the auxiliary dynamic image according to the preset rule may refer to Step 4023a3, and Steps 001 to 005 shown in FIG. 8, which steps are not be repeated.

In Step 4023b, the server processes the target static image using the auxiliary dynamic image to obtain the target cover image.

A method of processing the target static image using the auxiliary dynamic image to obtain the target cover image may refer to Step 4024a shown in FIG. 9, FIG. 10, or FIG. 11. In some embodiments, the auxiliary dynamic image is superposed on the target static image to obtain the target cover image. In some embodiments, the target static image is replaced with the auxiliary dynamic image to obtain the target cover image. In some embodiments, the auxiliary dynamic image is combined with the target static image to obtain the target cover image. The detailed processes are discussed above and not repeated here.

It is noted that the order of the steps of the method for acquiring a target cover image according to an acquisition request as shown in FIG. 12 may be adjusted. For example, Step 4021b may be executed after Step 4022b. The disclosed embodiments do not limit the order of the steps being executed.

Figure 14:
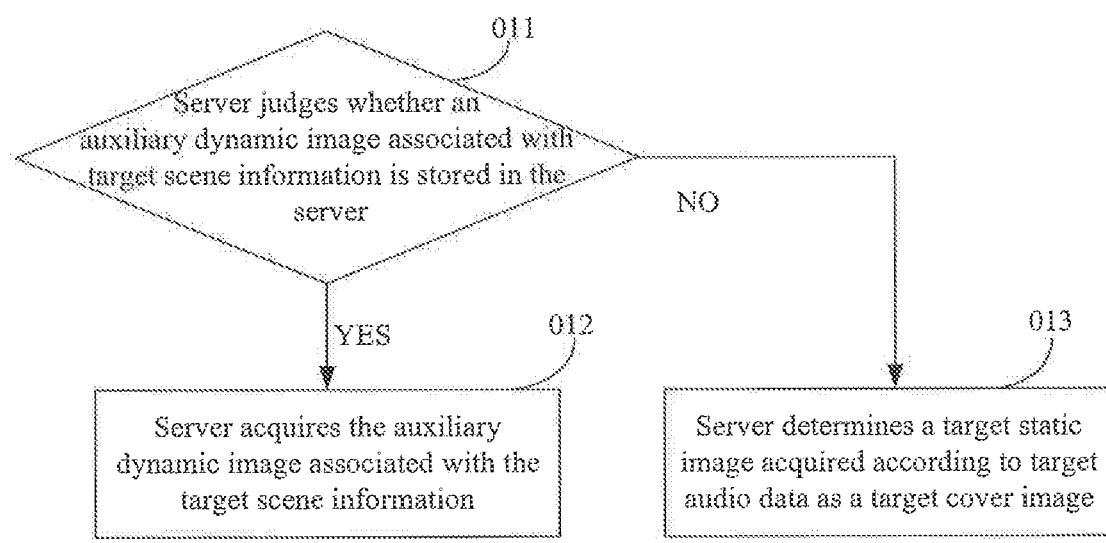
FIG. 14 is a flowchart showing a method for acquiring a target cover image, according to an exemplary embodiment.

It is noted that the server may judge whether the auxiliary dynamic image associated with the target scene information is stored in the server, and based on a judgment, execute the process of acquiring a target cover image, as shown in FIG. 14. FIG. 14 is a flowchart showing a method for acquiring a target cover image, according to an exemplary embodiment. The method includes the following steps.

In Step 011, the server judges whether the auxiliary dynamic image associated with the target scene information is stored in the server. Step 012 is executed if the auxiliary dynamic image is stored in the server (Yes, Step 011), and Step 013 is executed if the auxiliary dynamic image is not stored in the server (No, Step 011).

In Step 012, the server acquires the auxiliary dynamic image associated with the target scene information.

Step 012 may be Step 4023a or Step 4022b, and a specific process may refer to Step 4023a or Step 4022b. The server may execute a subsequent step such as Step 4024a or Step 4023b after acquiring the auxiliary dynamic image associated with the target scene information.

In Step 013, the server determines the target static image acquired according to the target audio data as the target cover image.

If the auxiliary dynamic image is not stored in the server, the server may not process the target static image, and may directly determine the target static image as the target cover image. A process of acquiring the target static image according to the target audio data by the server may use any suitable methods known in the related art, and is not be repeated here.

As described above, in the disclosed embodiments, because the auxiliary dynamic image is used to process the target static image to obtain the target cover image, and the auxiliary dynamic image is determined according to the target scene information that represents the scene characteristic of the environment in which the terminal is located, the finally obtained target cover image may reflect the scene characteristic of the environment in which the terminal is located. Accordingly, the display forms of the audio cover become versatile. The display becomes more interesting. In addition, the audio cover functions as a prompt to the user. For example, if the target scene information includes season and the indicated season is winter, the dynamic image "snow dances" may be displayed on the target cover image. If the target scene information includes weather and the indicated weather is heavy rain, the dynamic image "rain pours down" may be displayed on the target cover image. If the target scene information includes a landmark and the indicated landmark is a cup of coffee, "steaming coffee" may be displayed on the target cover image. If the target scene information includes a geographical location and the geographical location is sea, "waving seawater" may be displayed on the target cover image.

In a second aspect, the server may acquire a target cover image by querying the preset cover database according to an acquisition request.

Figure 15:
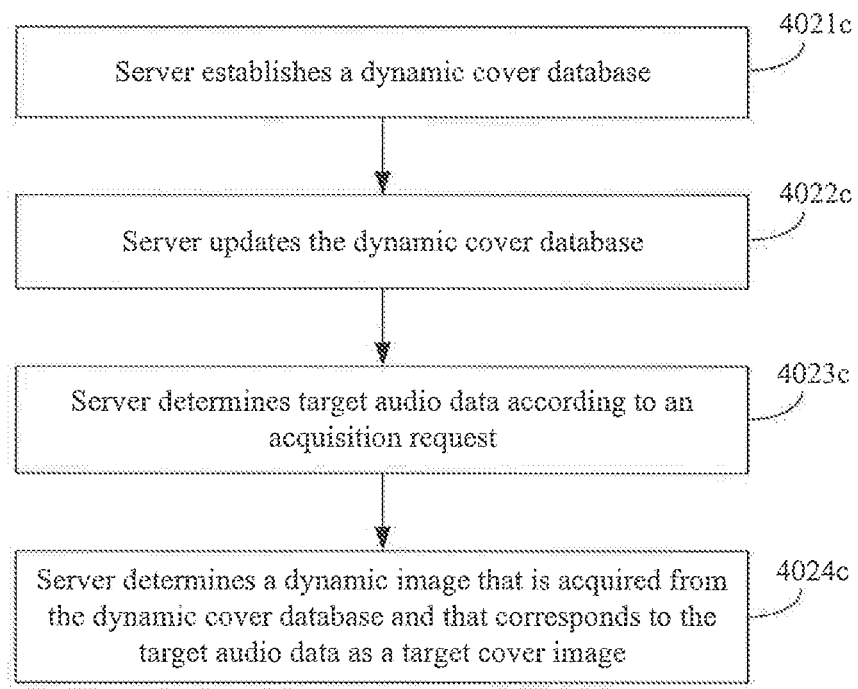
FIG. 15 is a flowchart showing a method for acquiring a target cover image according to an acquisition request, according to another exemplary embodiment.

FIG. 15 is a flowchart showing a method for acquiring a target cover image according to an acquisition request, according to another exemplary embodiment of the present disclosure. As shown in FIG. 15, the method includes the following steps.

In Step 4021c, the server establishes a dynamic cover database.

In the disclosed embodiments the cover database may include a dynamic cover database and/or a static cover database. The cover database is configured to store audio information. Each piece of audio information may include audio data and an audio cover. The audio covers stored in the dynamic cover database may include dynamic images. The audio covers stored in the static cover database may include static images. The audio data may include description information of an audio file, playing data of the audio file and the like. The description information of the audio file may include related information such as the name, lyrics, and source of the audio file, and may be in a text format, such as the "txt" format. The playing data of the audio file may include actual audio data and may be in an audio format such as WAV and mp3. The playing data of the audio file may include at least one audio file, or may include a set of multiple audio files. If the playing data of the audio file includes a set of multiple audio files, the description information of the audio file may be the overall description information of the set of the multiple audio files, or may be the description information of each audio file, as discussed above. The static image is typically a preset static picture. For example, the audio information stored in the static cover database may be song menu information. Each piece of audio information may include song menu data and a static image. The song menu data may include description information of a song menu, playing data of the song menu and the like. The description information of the song menu may include related information such as the name, representative songs, and source of the song menu. The playing data of the song menu includes an audio file corresponding to each song in the song menu, and accordingly, includes a set of multiple audio files. For example, the description information of the song menu may be "one singer one signature song," "it is sunny on Valentine's day, it rains suddenly . . . ," and the source "xx music." The source "xx music" is a server name corresponding to the audio playback App that provides "one singer one signature song." For example, the audio data corresponding to the audio information with the identifier 100 may include description information of "classical songs of Wang Fei," playing data of "classical songs of Wang Fei" and the like. The description information may include: "classical songs of Wang Fei, being capable of moving one's heart, and sometimes being as quiet as lakes and as blue as the sky." and the source "xx music." The source "xx music" is the server name corresponding to the audio playback App that provides the target audio data "classical songs of Wang Fei."

In Step 4022c, the server updates the dynamic cover database.

When the server receives new audio information, it updates the dynamic cover database. There may be multiple methods for the server to use to update the dynamic cover database. The following two methods are exemplary embodiments of the present disclosure.

Figure 16:
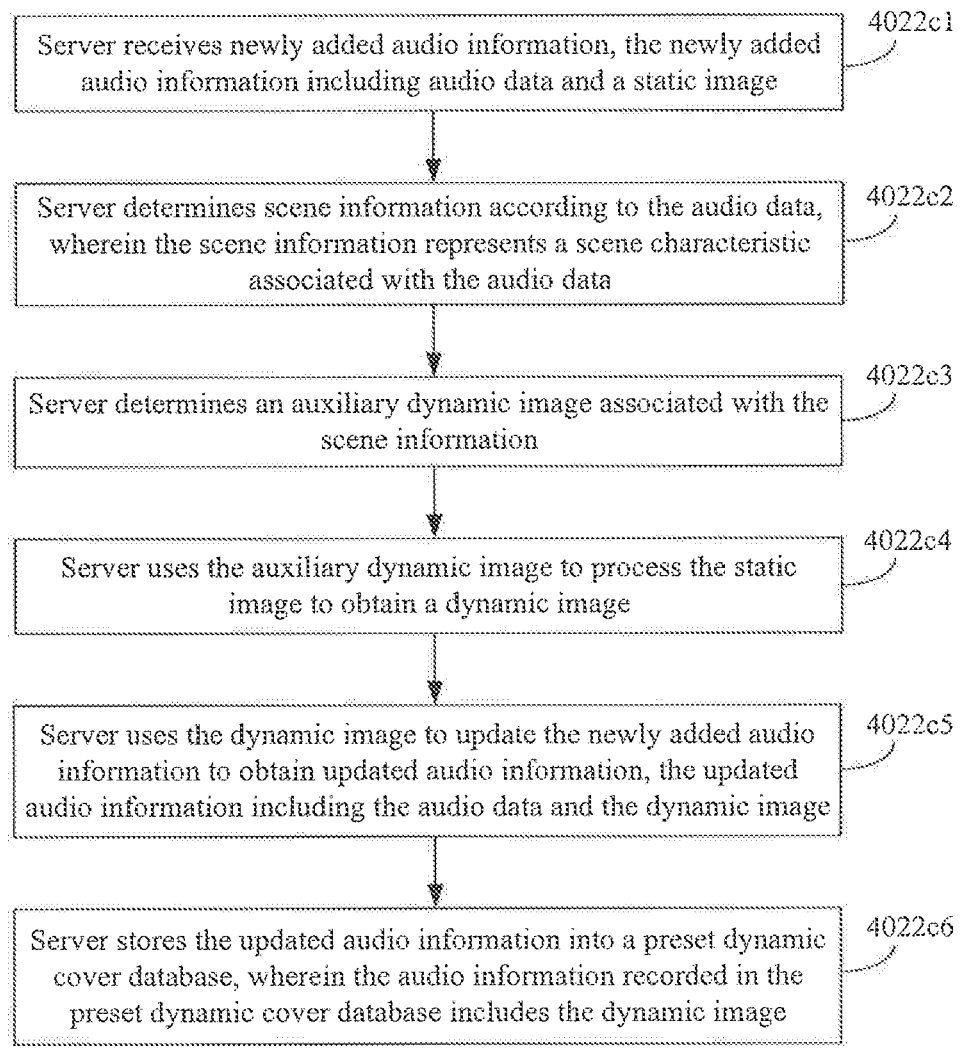
FIG. 16 is a flowchart showing a method for updating a dynamic cover database, according to an exemplary embodiment.

FIG. 16 is a flowchart showing a method for updating a dynamic cover database, according to an exemplary embodiment of the present disclosure. As shown in FIG. 16, in a first implementation, the method includes the following steps.

In Step 4022c1, the server receives newly added audio information, the newly added audio information including audio data and a static image.

For example, as shown in Table 3, each piece of audio information stored in the cover database may include audio data and a dynamic image. The dynamic image is obtained by processing the preset static image. Each piece of audio information may be provided with a unique identifier that facilitates searching for the audio information. Each dynamic image may also be provided with a unique identifier that facilitates searching for the dynamic image. The unique identifiers of the dynamic images are not marked in Table 3. For example, as shown in Table 3, audio data included in audio information with an identifier 101 is an audio file set or audio set "classical songs of Xie Tingfeng," and a dynamic image is the head portrait of Xie Tingfeng.

TABLE 3

| Audio information | | |
| --- | --- | --- |
| Audio data | Dynamic image | Identifier |
| Audio set "classical songs of Xie Tingfeng" | Head portrait of Xie Tingfeng | 101 |
| Audio set "slow songs" | Static picture of slow songs | 102 |
| Audio set "one singer one signature song" | Static picture of sea | 103 |
| Audio set "old love songs" | Static picture of flowers | 104 |

The newly added audio information may be uploaded to the server by a server manager through a backend terminal such as a computer. Additionally or alternatively, the newly added audio information may be input into the server by a server manager through an input module (such as an Input/Output (I/O) interface) of the server. The newly added audio information may include audio data and a static image. The server may store the audio information into the dynamic cover database, and process the static image to obtain a dynamic image. The server may update the dynamic cover database with the dynamic image. The server may also store the audio information into the static cover database, and process the static image to obtain the dynamic image. The server may store the newly added audio information corresponding to where the dynamic image is located into the dynamic cover database. For example, if an identifier of the newly added audio information is 101, the newly added audio information may include audio data: audio set "classical songs of Wang Fei" and a static image: the head portrait of Wang Fei. The server may also process the static image to obtain the dynamic image and then store the audio information including the audio data and the dynamic image into the database.

In Step 4022c2, the server determines scene information according to the audio data. The scene information represents a scene characteristic associated with the audio data.

In the disclosed embodiments, the scene information represents the scene characteristic associated with the added audio data. The scene characteristic may reflect some characteristics of the target audio data. For example, the scene information may include at least one of the following: season, a geographical location, a landmark, weather, mood or time. The season may include spring, summer, autumn, and winter. The geographical location may include a manually divided region such as Beijing and Shanghai, or a characteristic natural area such as a sea, a lake, and grassland. The landmark may include an object such as Pearl of the Orient, ice, snow, the moon, and stars. The weather may include windy weather, stormy weather, foggy weather, rainy weather and the like. The mood may be happiness, sadness and the like. The time may include early morning, evening and the like. The scene information is only schematically described in the embodiments of the present disclosure, and other apparent embodiments also fall within the scope of the present disclosure.

In Step 4022c3, the server determines an auxiliary dynamic image associated with the scene information.

In the disclosed embodiments, a process of determining the auxiliary dynamic image associated with the scene information by the server may refer to the process of Step 4023a shown in FIG. 6 in the above mentioned embodiments, and is not repeated.

In Step 4022c4, the server uses the auxiliary dynamic image to process the static image to obtain a dynamic image.

In some embodiments, an auxiliary dynamic image may be superposed on a static image to obtain a dynamic image. In some embodiments, the static image may be replaced with the auxiliary dynamic image to obtain the dynamic image. In other embodiments, the target static image may be processed using the auxiliary dynamic image to obtain the dynamic image.

Referring back to FIG. 9, which shows a schematic illustration of a method for processing a static image to obtain a dynamic image using an auxiliary dynamic image, an auxiliary dynamic image may be superposed on a static image to obtain a dynamic image. For example, if the auxiliary dynamic image is a dynamic picture N displaying the dynamic image "snow dances," the static image is a static picture M displaying the head portrait of Wang Fei, dynamic picture N is superposed on static picture M to obtain a dynamic picture P1. The dynamic picture P1 displays a scene where snow dances on the head portrait of Wang Fei, and the dynamic picture P1 is determined as the dynamic image.

Referring back to FIG. 10, which shows a schematic illustration of a method for processing a static image to obtain a dynamic image using an auxiliary dynamic image, a static image is replaced with an auxiliary dynamic image to obtain a dynamic image. For example, if the auxiliary dynamic image is a dynamic picture N displaying the dynamic image "snow dances," the target static image is a static picture M displaying the head portrait of Wang Fei, static picture M may be covered by dynamic N to obtain a dynamic picture P2. Static picture M may also be replaced with dynamic picture N to obtain the dynamic picture P2. The dynamic picture P2 displays the scene "snow dances" to achieve a display effect that is the same as that of the dynamic picture N. The dynamic picture P2 is determined as the target cover image.

Referring back to FIG. 11, which shows a schematic illustration of a method for using an auxiliary dynamic image to process a target static image to obtain a target cover image, an auxiliary dynamic image and a target static image are combined to obtain a dynamic image. For example, if the auxiliary dynamic image is a dynamic picture N displaying the dynamic image "snow dances," the target static image is a static picture M displaying the head portrait of Wang Fei, dynamic picture N may be combined with static picture M to obtain a dynamic picture P3. For example, dynamic picture N is arranged above static picture M to obtain a dynamic picture P3. The dynamic picture P3 simultaneously displays the head portrait of Wang Fei and the scene "snow dances." The dynamic picture P3 is determined as the target cover image.

In Step 4022c5, the server uses the dynamic image to update the newly added audio information to obtain updated audio information. The updated audio information includes the audio data and the dynamic image.

For example, if the dynamic image represents the scene where "snow dances" on the head portrait of Wang Fei, the head portrait of Wang Fei in the newly added audio information is updated using the dynamic image to obtain updated audio information, and the updated audio information includes the dynamic image.

In Step 4022c6, the server stores the updated audio information into the preset dynamic cover database. The audio information recorded in the preset dynamic cover database includes the dynamic image.

For example, the cover database in which the updated audio information is stored may be shown in Table 4. An identifier of the newly added audio information is 100, and the newly added audio information may include audio data: audio set "classical songs of Wang Fei" and a dynamic image: snow dances on the head portrait of Wang Fei.

TABLE 4

| Audio information | | |
| --- | --- | --- |
| Audio data | Dynamic image | Identifier |
| Audio set "classical songs of Xie Tingfeng" | Head portrait of Xie Tingfeng | 101 |
| Audio set "slow songs" | Static picture of slow songs | 102 |
| Audio set "one singer one signature song" | Static picture of sea | 103 |

TABLE 4-continued

| Audio information | | |
| --- | --- | --- |
| Audio data | Dynamic image | Identifier |
| Audio set "old love songs" | Static picture of flowers | 104 |
| Audio set "classical songs of Wang Fei" | Head portrait of Wang Fei | 100 |

Figure 17:
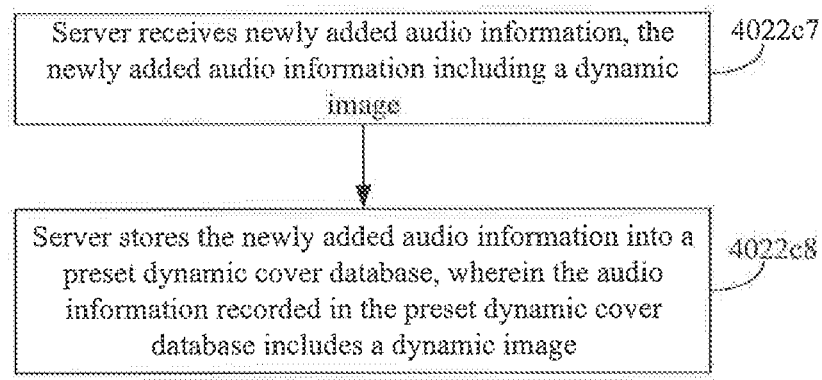
FIG. 17 is a flowchart showing a method for updating a dynamic cover database, according to another exemplary embodiment.

A second implementation method is shown in FIG. 17. FIG. 17 is a flowchart showing another method for updating a dynamic cover database, according to an exemplary embodiment of the present disclosure. As shown in FIG. 17, in the second implementation method, the method includes the following steps.

In Step 4022c7, the server receives newly added audio information, the newly added audio information including a dynamic image.

The newly added audio information may be uploaded to the server by the server manager through the backend terminal such as a computer, or may be input into the server by a server manager through the input module (such as the I/O interface) of the server. The newly added audio information may include audio data and the dynamic image, or may include the dynamic image only, which is not limited in the disclosed embodiments.

In Step 4022c8, the server stores the newly added audio information into the preset dynamic cover database. The audio information recorded in the preset dynamic cover database includes a dynamic image.

Each piece of audio information stored in the preset dynamic cover database may, as shown in Table 3, includes audio data and a dynamic image. The dynamic image is obtained by processing the preset static image. Each piece of audio information may be provided with a unique identifier that facilitates searching for the audio information. Each dynamic image may also be provided with a unique identifier that facilitates searching for the dynamic image. The unique identifiers of the dynamic images are not marked in Table 3. For example, as shown in Table 3, audio data included in audio information with an identifier 101 is an audio set "classical songs of Xie Tingfeng," and a dynamic image is the dynamic head portrait of Xie Tingfeng. Each piece of audio information stored in the preset cover database may also include the dynamic image only, which is not limited in the disclosed embodiments.

In Step 4023c, the server determines target audio data according to the acquisition request.

A process of determining the target audio data according to the acquisition request by the server may refer to Step 4021a, and will not be repeated.

In Step 4024c, the server determines the dynamic image that is acquired from the dynamic cover database and that corresponds to the target audio data as the target cover image.

The cover database is configured to record audio information. Each piece of audio information includes audio data and a dynamic image. If the information recorded in the preset dynamic cover database is shown in Table 3, the dynamic image included in the same audio information with the target audio data may be determined as the dynamic image corresponding to the target audio data. The dynamic cover database is configured to record the audio information, and each piece of audio information may include the audio data and the dynamic image. The dynamic image includes any one of a dynamic picture, a video, and dynamic display information. The dynamic display information includes: a dynamic parameter and a static picture. The dynamic parameter indicates a changing characteristic of the display parameter during display of the static picture.

Figure 18:
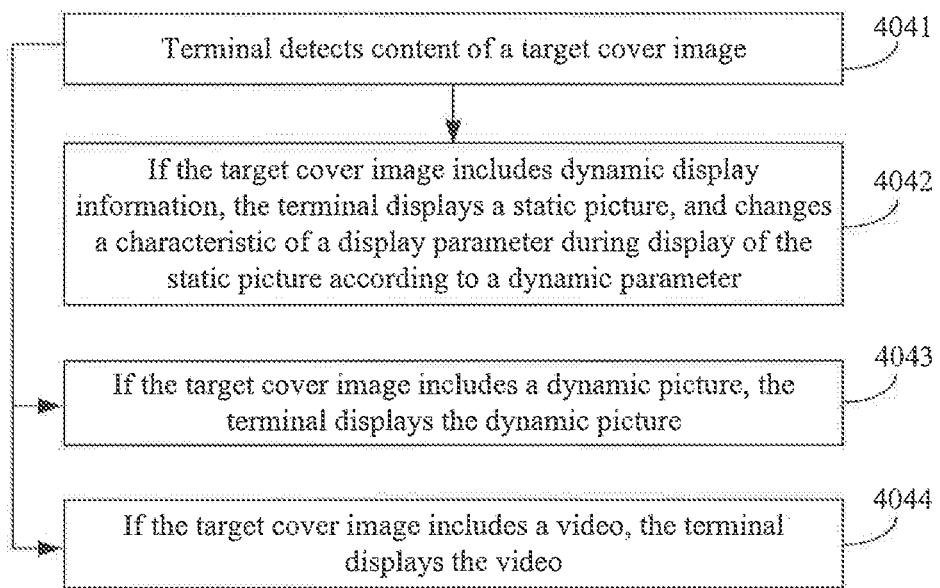
FIG. 18 is a flowchart showing a method for displaying a target cover image, according to another exemplary embodiment.

Optionally, in Step 404 (shown in FIG. 4), the target cover image may be displayed according to the content of the target cover image. FIG. 18 is a flowchart showing a method for displaying a target cover image, according to an exemplary embodiment of the present disclosure. The method shown in FIG. 18 includes the following steps.

In Step 4041, the terminal detects the content of the target cover image.

In Step 4042, if the target cover image includes dynamic display information, the terminal displays the static picture, and changes the characteristic of the display parameter during display of the static picture according to the dynamic parameter.

The dynamic display information may include a dynamic parameter and a static picture. The dynamic parameter indicates the changing characteristic of the display parameter during display of the static picture. The dynamic parameter may be a continuously changing value of the display parameter, such as a picture resolution, an image position, the scanning frequency of the display, or the refreshing rate of the display. By adjusting the display parameter of the static picture according to the dynamic parameter a dynamic display effect may be achieved when the static picture is displayed, and a dynamic image may be represented to the user. For example, if the dynamic parameter is a continuously changing value of the image position, images showing two objects, e.g., grass and cloud, appear in the static picture, the dynamic parameter may indicate that a position of the grass continuously changes on the display interface of the terminal along a grid line scanning direction and that a position of the cloud continuously changes on the display interface of the terminal along a direction opposite to the grid line scanning direction. Referring back to FIG. 7, which is a display image showing continuous change of a static picture, display images of the same static picture at three continuous adjacent time points are employed as an example. A display time interval between every two display images is a preset time length. The preset time length may be a suitable time length, such as 0.2 second. The dynamic display effect may be achieved by rapidly and periodically displaying the three display images on the display interface of the terminal. The grid line scanning direction is the left-to-right direction x in FIG. 7.

Therefore, if the target cover image includes dynamic display information, the terminal displays the static picture using a parameter value indicated by the dynamic parameter to achieve the dynamic display effect of the static picture. For example, if the dynamic parameter is a continuously changing value of the scanning frequency of the display, and the static picture includes multiple star images, the terminal may adjust the scanning frequency of the display interface of the display according to the dynamic parameter to achieve the dynamic display effect of star twinkling.

It is noted that using the dynamic display information to display the audio cover is just one exemplary method for dynamically displaying the static image. There are many methods according to the disclosed embodiments. For example, the terminal may display the audio cover, according to an instruction from the server, using an animation technology. The animation technology refers to a technology of moving a picture or a part of the picture displayed on the display interface according to a certain rule or requirement. There are three manners for movement on the display interface, i.e., keeping the position unchanged and changing the form; keeping the form unchanged and changing the position; and changing both the position and the form. For example, in the animation technology, using a picture object array, a series of images showing continuous actions may be stored in a memory to implement rapid transformation of the images. The picture object array may be provided to the terminal by the server. Various methods based on the picture object array known in the related art may be used.

In Step 4043, if the target cover image includes a dynamic picture, the terminal displays the dynamic picture.

In the disclosed embodiments, the dynamic picture may be a GIF picture, which takes a small storage space that is almost the same as that occupied by a static picture. Accordingly, occupation of the memory may be reduced during storage. In addition, traffic consumed when the terminal acquires the target cover image from the server may be reduced.

In Step 4044, if the target cover image includes a video, the terminal displays the video.

Figure 19:
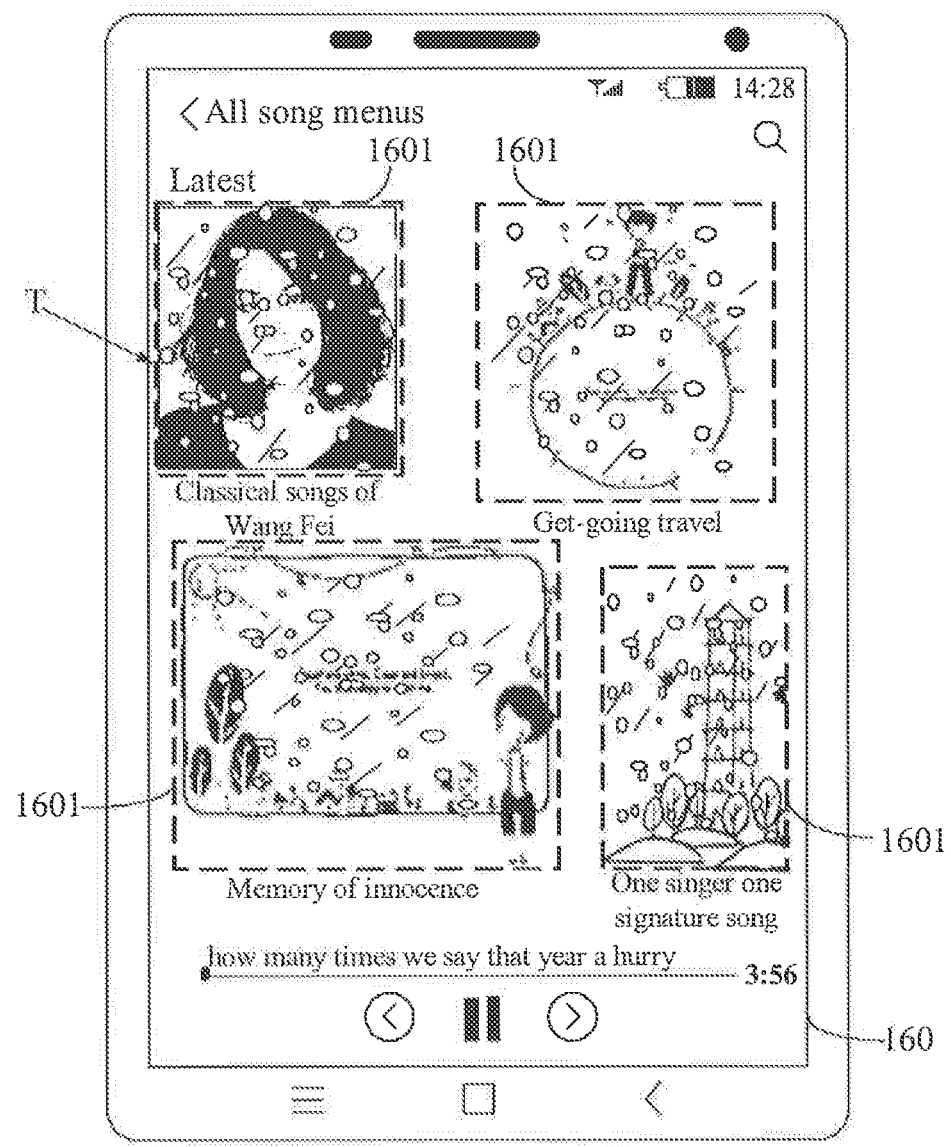
FIG. 19 shows display effect of a dynamic cover image, according to an exemplary embodiment.

It is noted that multiple target cover images may be acquired according to each acquisition request. Each target cover image may be a dynamic image, and/or a static image. FIG. 19 is a picture illustrating a display effect of a dynamic cover image, according to an exemplary embodiment. If the acquisition request is configured to request for a target cover image of an interface where "greatest song menu" is located, and contains target scene information, and the target scene information includes weather that indicates light rain, the finally acquired target cover images are shown in FIG. 19. FIG. 19 shows a picture illustrating the display effect of the dynamic audio covers of the interface where "greatest song menu" is located. The interface displays four target cover images, i.e., "classical songs of Wang Fei", "Get-going Travel," "Memory of Innocence," and "one singer one signature song" respectively. A dynamic image "rain drops" is superposed on each cover image for displaying. Moreover, in the dynamic image, a scene that raindrops whip the screen and flow down along the screen may be displayed to give a feeling to the user that water drips on the screen of the terminal. Accordingly, the cover images may reflect that the weather of the location of the terminal is rainy weather. Thus, the cover images function as a prompt to the user. The cover image is displayed more interestingly. It is noted that the dynamic cover image may be positioned in the image display area 1601 of the display interface 160 when the audio cover is displayed. A display form of another area (such as a text display area or a button display area) of the cover display interface of the terminal is the same as that in the related art. The terminal may display related information of the audio cover on the other area. For example, introduction to the audio cover and the like may be displayed in the text display area, and some audio buttons such as a play button may be displayed in the button display area.

Optionally, a changeable lock screen or a changeable framework may be adopted to adjust the display of the dynamic cover image in the process of displaying the target cover image.

Figure 20:
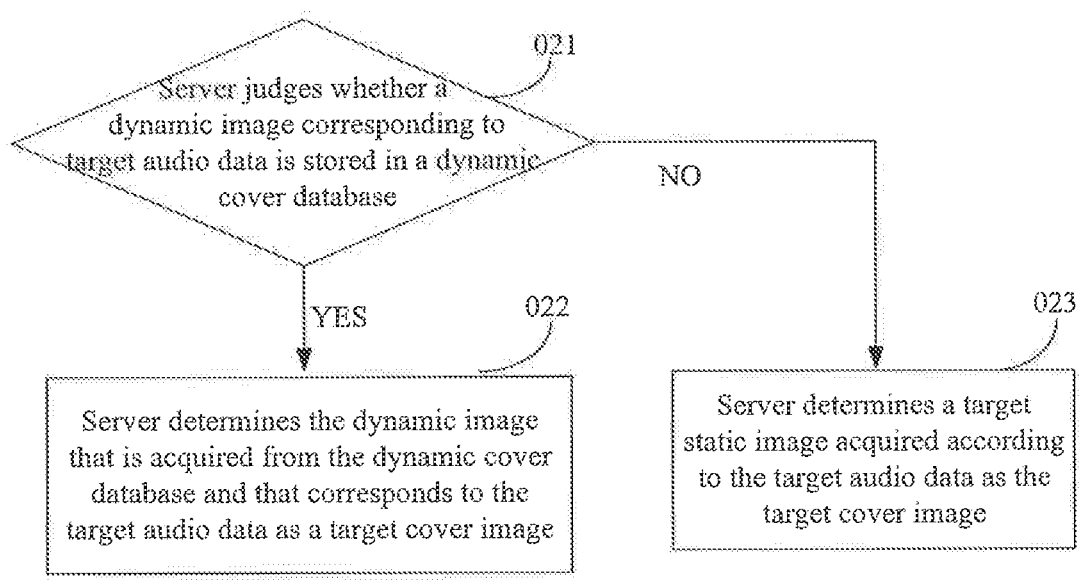
FIG. 20 is a flowchart showing a method for acquiring a target cover image, according to an exemplary embodiment.

It is noted that whether the dynamic cover image corresponding to the target audio data is stored in the dynamic cover database may be judged before step 4023*c* is executed. Based on the judgment, the acquisition process of the dynamic cover image is executed, as shown in FIG. 20. FIG. 20 is a flowchart showing a method for acquiring a target cover image, according to an exemplary embodiment. The method includes the following steps.

In Step 021, a server judges whether a dynamic image corresponding to target audio data is stored in a dynamic cover database. Step 022 is executed if the dynamic image corresponding to the target audio data is stored in the dynamic cover database (Yes, Step 021), otherwise, Step 023 is executed if the dynamic image corresponding to the target audio data is not stored in the dynamic cover database (No, Step 021).

In Step 022, the server determines the dynamic image that is acquired from the dynamic cover database and that corresponds to the target audio data as a target cover image.

Step 022 is the same as Step 4024c, and may refer to the process of Step 4024c, which is not repeated.

In Step 023, the server determines a target static image acquired according to the target audio data as the target cover image.

The step that the server determines the target static image acquired according to the target audio data as the target cover image may refer to the related art, and is not repeated.

Figure 21:
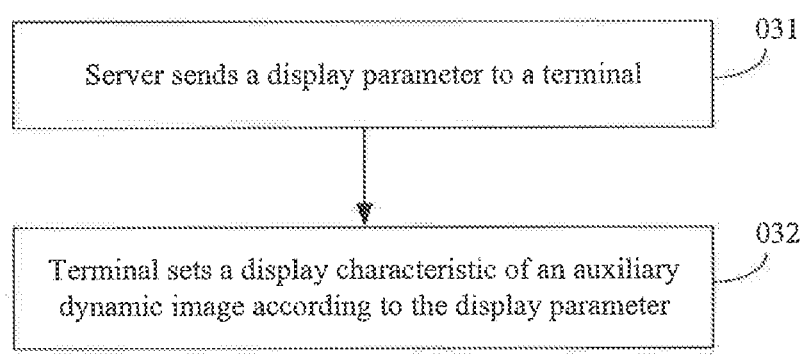
FIG. 21 is a flowchart showing a cover image display method, according to an exemplary embodiment.

If the target cover image is a dynamic cover image, and is obtained by superposing an auxiliary dynamic image on a target static image, FIG. 21 is a flowchart showing a cover image display method, according to an exemplary embodiment. As shown in FIG. 21, the cover image display method includes the following steps.

In Step 031, a server sends a display parameter to a terminal.

The display parameter includes at least one of the following: transparency, a resolution, or an image position. The transparency may refer to the transparency of an image. The levels of transparency from an original image to a colorless and transparent image are divided into 100 percent, and the transparency may be represented by percentage. The resolution may be classified in terms of display resolution and image resolution. The display resolution (also called a screen resolution) reflects the precision of a screen image, and refers to the number of pixels that can be displayed by the display. The image resolution is the number of pixels per inch. The image position may be a coordinate position of the image that is displayed on the display.

In Step 032, the terminal sets a display characteristic of an auxiliary dynamic image according to the display parameter.

As shown in FIG. 19, if the target cover image T in FIG. 19 is obtained by superposing the auxiliary dynamic image "rain drops" on the target static image, i.e., the head portrait of Wang Fei, and the display parameter includes transparency of 50 percent, the terminal sets the transparency of the auxiliary dynamic image during display to be 50 percent according to the display parameter. When the terminal displays the target cover image T shown in FIG. 19, the transparency of "rain drops" is 50 percent.

It is noted that the order in which the steps of the audio cover display method are executed may be adjusted. Steps may be added or omitted according to a condition, and any variations of the disclosed methods apparent to those skilled in the art fall within the technical scope of the present disclosure.

As described above, according to the disclosed audio cover display methods, the server acquires the target cover image according to the acquisition request sent by the terminal, and provides the target cover image to the terminal. The terminal displays the target cover image. Because the target cover image is a dynamic cover image and/or a static cover image, the display forms of the audio cover become versatile, and the audio cover may be displayed more flexibly.

Figure 22:
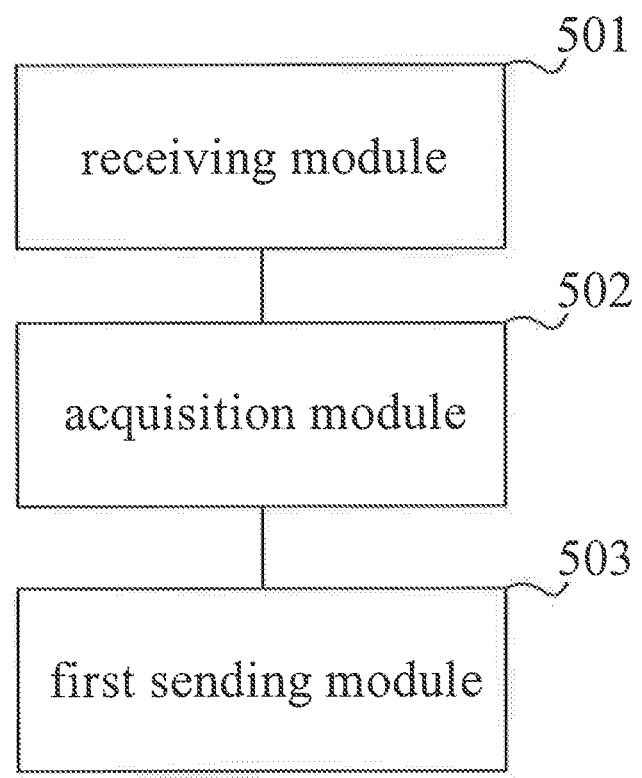
FIG. 22 is a block diagram of a device for displaying an audio cover, according to an exemplary embodiment.

FIG. 22 is a block diagram of a device for displaying an audio cover, according to an exemplary embodiment. The device may be used in server 110 shown in FIG. 1. As shown in FIG. 22, the device includes:

a receiving module 501 configured to receive from a terminal an acquisition request that requests a target cover image;

an acquisition module 502 configured to acquire the target cover image according to the acquisition request, wherein the target cover image is a dynamic cover image and/or a static cover image corresponding to an audio file; and a first sending module 503 configured to send the target cover image to the terminal, wherein the terminal is configured to display the target cover image.

As described above, according to the disclosed audio cover display device, the acquisition module 502 acquires the target cover image according to the acquisition request sent by the terminal, the first sending module 503 provides the target cover image for the terminal, and the terminal displays the target cover image. Because the target cover image is a dynamic cover image and/or a static cover image, display forms of an audio cover become versatile, and the audio cover may be displayed more flexibly.

Figure 23:
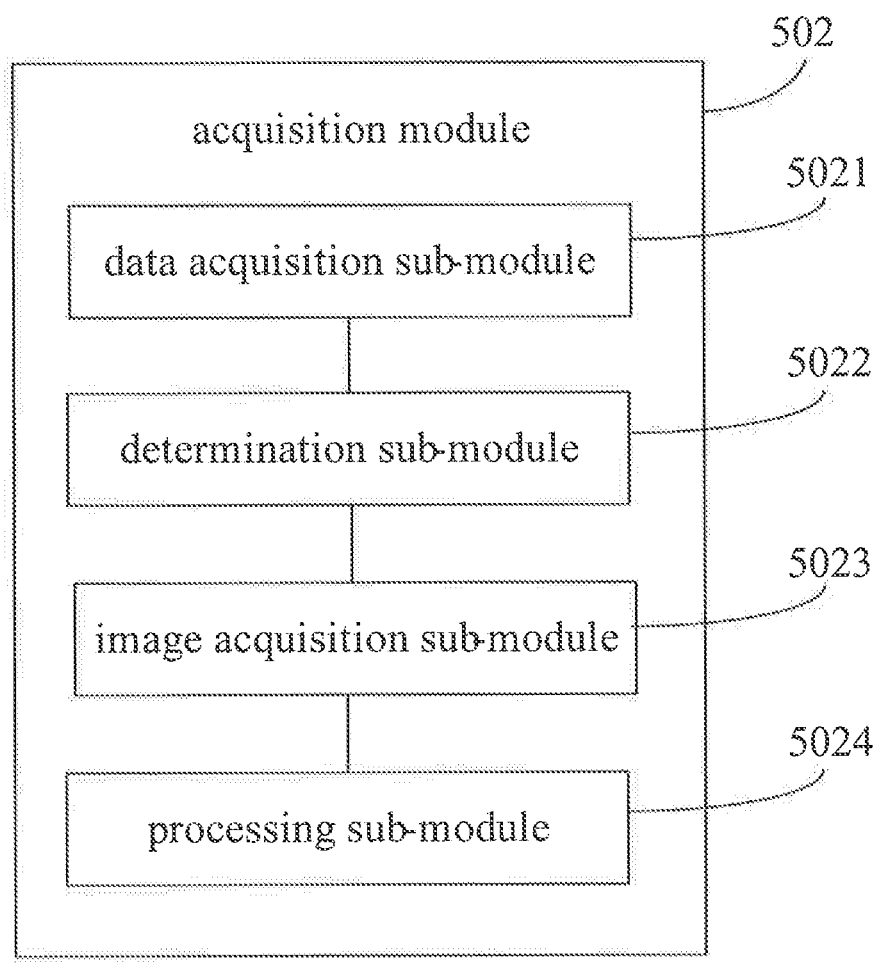
FIG. 23 is a block diagram of an acquisition module, according to an exemplary embodiment.

In one aspect, FIG. 23 is a block diagram of an acquisition module 502, according to an exemplary embodiment. As shown in FIG. 5-2, the acquisition module 502 includes:

a data acquisition sub-module 5021 configured to determine target audio data according to the acquisition request;

a determination sub-module 5022 configured to determine target scene information and a target static image according to the target audio data, wherein the target scene information represents a scene characteristic associated with the target audio data;

an image acquisition sub-module 5023 configured to acquire an auxiliary dynamic image associated with the target scene information; and a processing sub-module 5024 configured to use the auxiliary dynamic image to process the target static image to obtain the target cover image.

Figure 24:
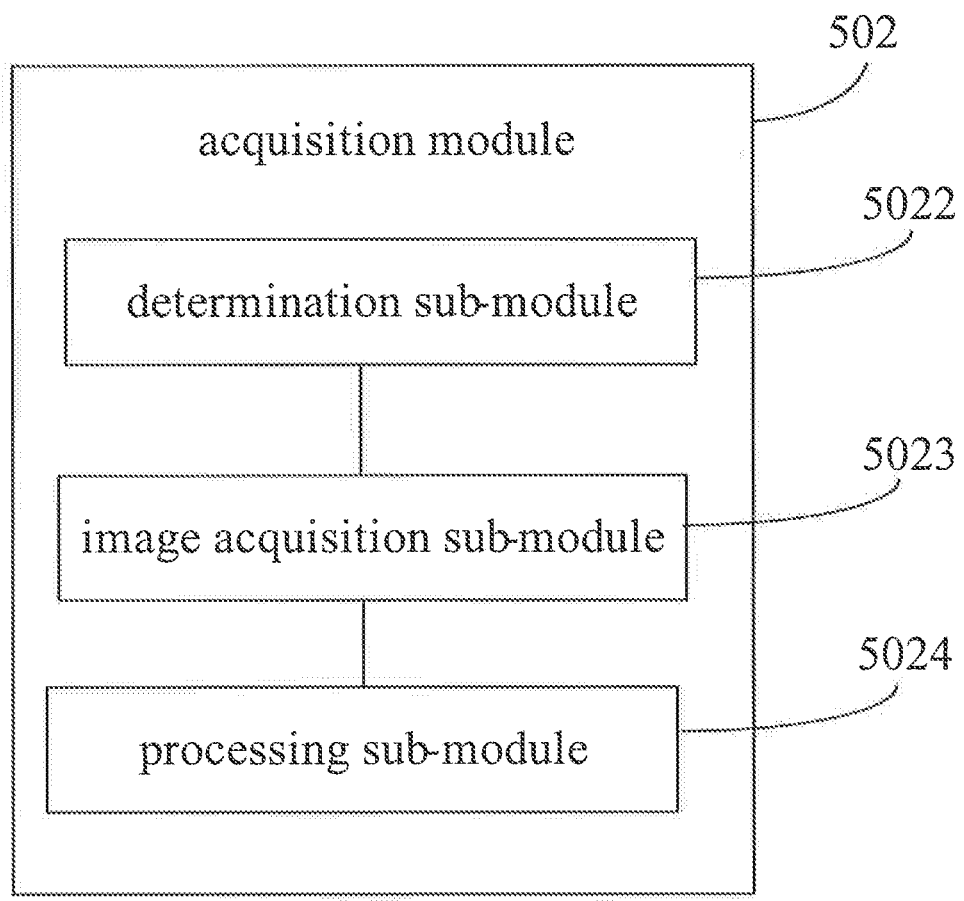
FIG. 24 is a block diagram of another acquisition module, according to an exemplary embodiment.

In some embodiments, the acquisition request includes target scene information. The target scene information represents a scene characteristic of an environment in which a terminal is located. FIG. 24 is a block diagram of another acquisition module 502, according to an exemplary embodiment. As shown in FIG. 24, the acquisition module 502 includes:

a determination sub-module 5022 configured to acquire a target static image according to the acquisition request;

an image acquisition sub-module 5023 configured to acquire an auxiliary dynamic image associated with the target scene information; and a processing sub-module 5024 configured to use the auxiliary dynamic image to process the target static image to obtain the target cover image.

Figure 25:
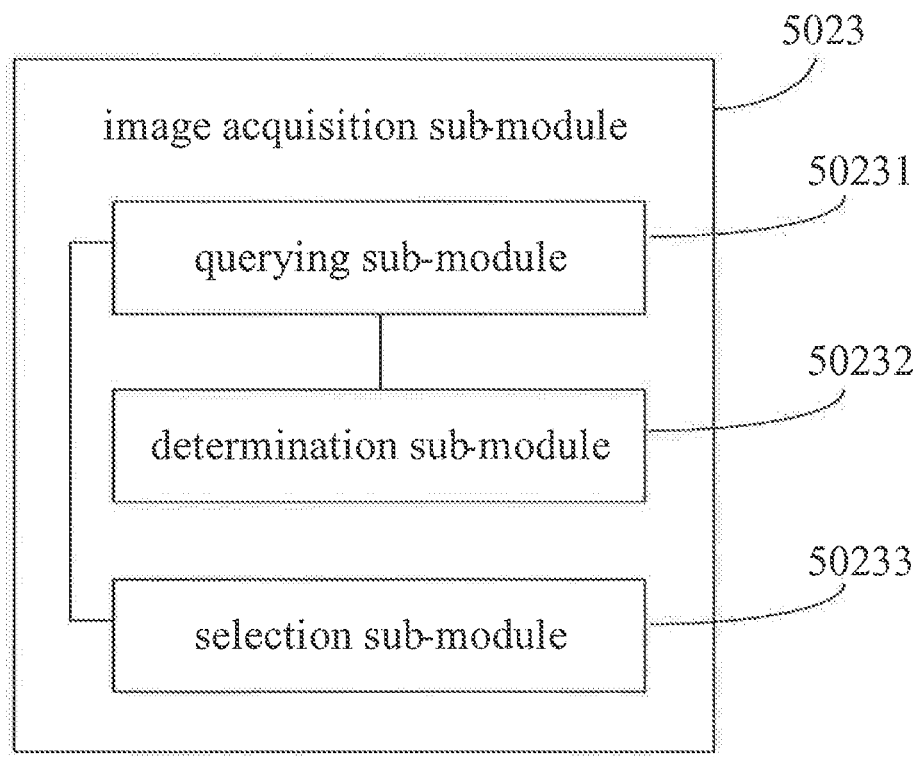
FIG. 25 is a block diagram of an image acquisition sub-module, according to an exemplary embodiment.

FIG. 25 is a block diagram of an image acquisition sub-module 5023, according to an exemplary embodiment. As shown in FIG. 25, the image acquisition sub-module 5023 includes:

a querying sub-module 50231 configured to query a preset relationship between scene information and a dynamic image;

a determination sub-module 50232 configured to, if there exists a dynamic image associated with the target scene information in the preset relationship between scene information and a dynamic image, determine the dynamic image associated with the target scene information as the auxiliary dynamic image; and a selection sub-module 50233 configured to, if there exist at least two dynamic images associated with the target scene information in the preset relationship between scene information and a dynamic image, select a dynamic image from the at least two dynamic images associated with the target scene information as the auxiliary dynamic image according to a preset rule.

The selection sub-module 50233 is configured to:

randomly select a dynamic image from the at least two dynamic images associated with the target scene information as the auxiliary dynamic image; or select a dynamic image that appears most times (i.e., most frequently) from the at least two dynamic images associated with the target scene information as the auxiliary dynamic image; or superpose the at least two dynamic images associated with the target scene information to form the auxiliary dynamic image; or provide the at least two dynamic images associated with the target scene information for the terminal, receive a selection instruction sent by the terminal, wherein the selection instruction indicates a dynamic image selected by a user from the at least two dynamic images associated with the target scene information, and determine the dynamic image selected by the user as the auxiliary dynamic image.

Optionally, the target scene information includes at least one of the following: a season, a geographical location, a landmark, weather, mood, or time.

The processing sub-module 5024 is configured to:

superpose the auxiliary dynamic image on the target static image to obtain the target cover image; or replace the target static image with the auxiliary dynamic image to obtain the target cover image; or combine the auxiliary dynamic image and the target static image to obtain the target cover image.

Figure 26:
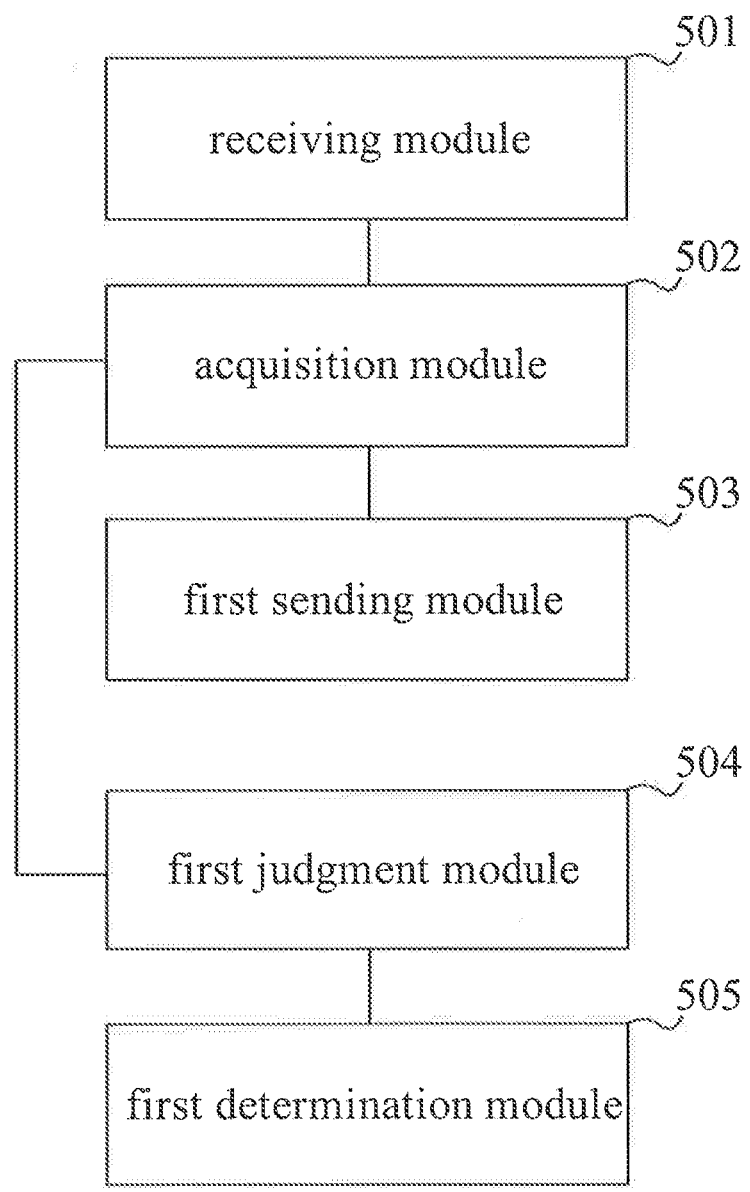
FIG. 26 is a block diagram of another device for displaying an audio cover, according to an exemplary embodiment.

FIG. 26 is a block diagram of another device for displaying an audio cover, according to an exemplary embodiment. The device may be used in the server 110 shown in FIG. 1. As shown in FIG. 26, the device further includes:

a first judgment module 504 configured to judge whether the auxiliary dynamic image associated with the target scene information is stored in the server; and a first determination module 505 configured to, if the auxiliary dynamic image is not stored in the server, determine the target static image acquired according to the acquisition request as the target cover image.

Optionally, the acquisition module 502 is configured to determine the target audio data according to the acquisition request, and determine a dynamic image that is acquired from a preset dynamic cover database and that corresponds to the target audio data as the target cover image. The dynamic cover database is configured to record audio information and each piece of audio information includes audio data and a dynamic image.

Figure 27:
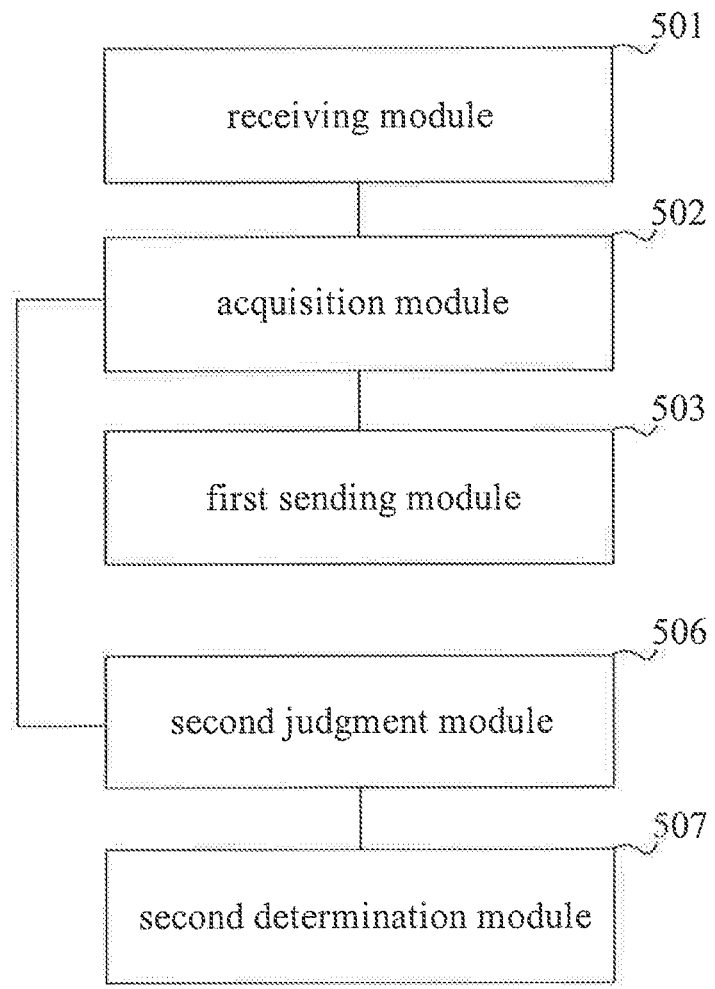
FIG. 27 is a block diagram of another device for displaying an audio cover, according to an exemplary embodiment.

FIG. 27 is a block diagram of another device for displaying an audio cover, according to an exemplary embodiment. The device may be used in the server 110 shown in FIG. 1. As shown in FIG. 27, the device further includes:

a second judgment module 506 configured to judge whether the dynamic image corresponding to the target audio data is stored in the dynamic cover database; and a second determination module 507 configured to, if the dynamic image corresponding to the target audio data is not stored in the dynamic cover database, determine the target static image acquired according to the acquisition request as the target cover image.

Figure 28:
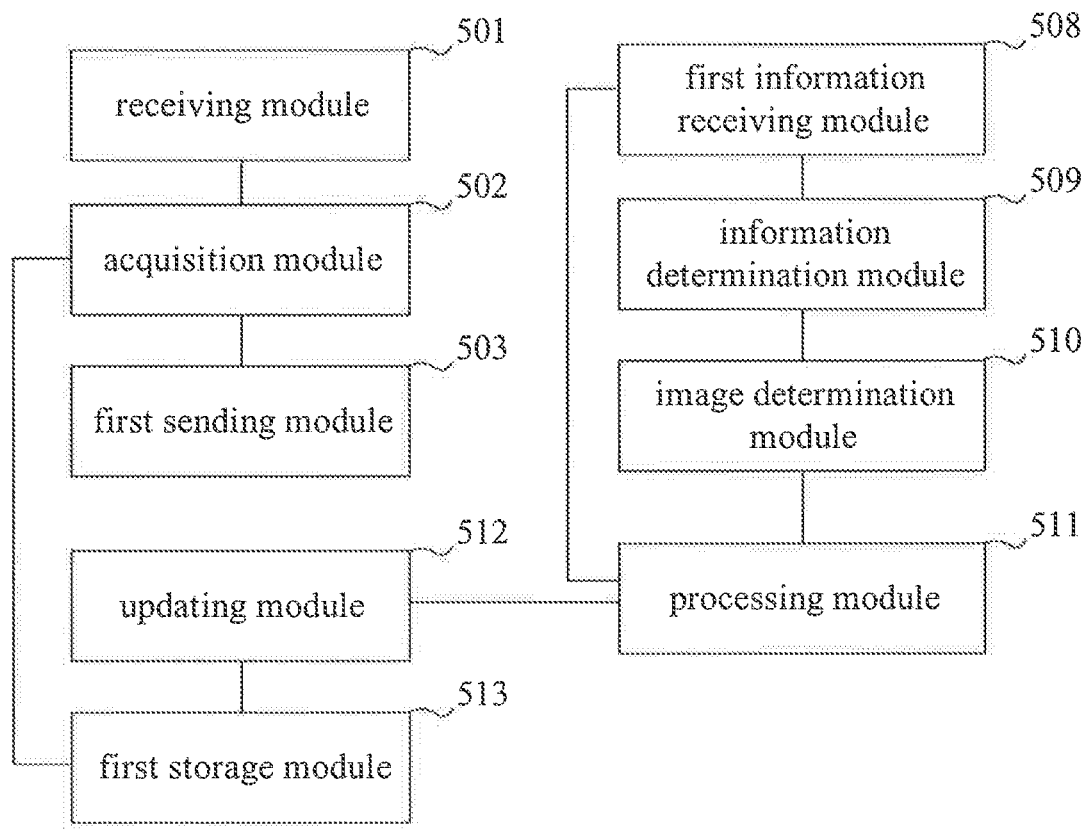
FIG. 28 is a block diagram of another device for displaying an audio cover, according to an exemplary embodiment.

FIG. 28 is a block diagram of another device for displaying an audio cover, according to an exemplary embodiment. The device may be used in the server 110 shown in FIG. 1. As shown in FIG. 28, the device further includes:

a first information receiving module 508 configured to receive newly added audio information, the newly added audio information including audio data and a static image;

an information determination module 509 configured to determine scene information according to the audio data, wherein the scene information represents a scene characteristic associated with the audio data;

an image determination module 510 configured to determine an auxiliary dynamic image associated with the scene information;

a processing module 511 configured to use the auxiliary dynamic image to process the target static image to obtain a target cover image;

an updating module 512 configured to use the dynamic image to update the newly added audio information to obtain updated audio information, the updated audio information including the audio data and the dynamic image; and a first storage module 513 configured to store the updated audio information into the preset dynamic cover database, wherein the audio information recorded in the preset dynamic cover database includes the dynamic image.

Figure 29:
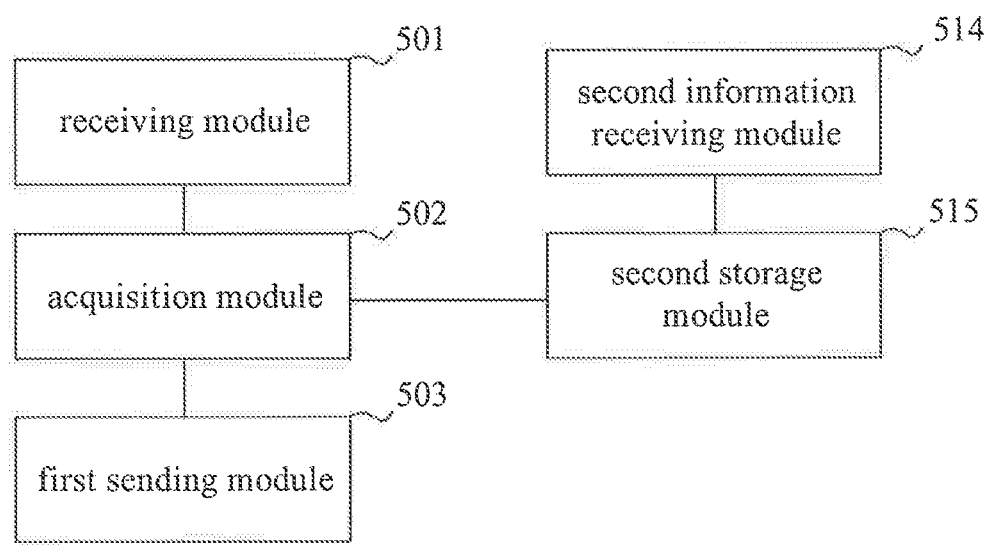
FIG. 29 is a block diagram of another device for displaying an audio cover, according to an exemplary embodiment.

FIG. 29 is a block diagram of a device for displaying an audio cover, according to another exemplary embodiment. The device may be used in the server 110 shown in FIG. 1. As shown in FIG. 29, the device further includes:

a second information receiving module 514 configured to receive newly added audio information, the newly added audio information including a dynamic image; and a second storage module 515 configured to store the newly added audio information into the preset dynamic cover database, wherein the audio information recorded in the preset dynamic cover database includes the dynamic image.

Figure 30:
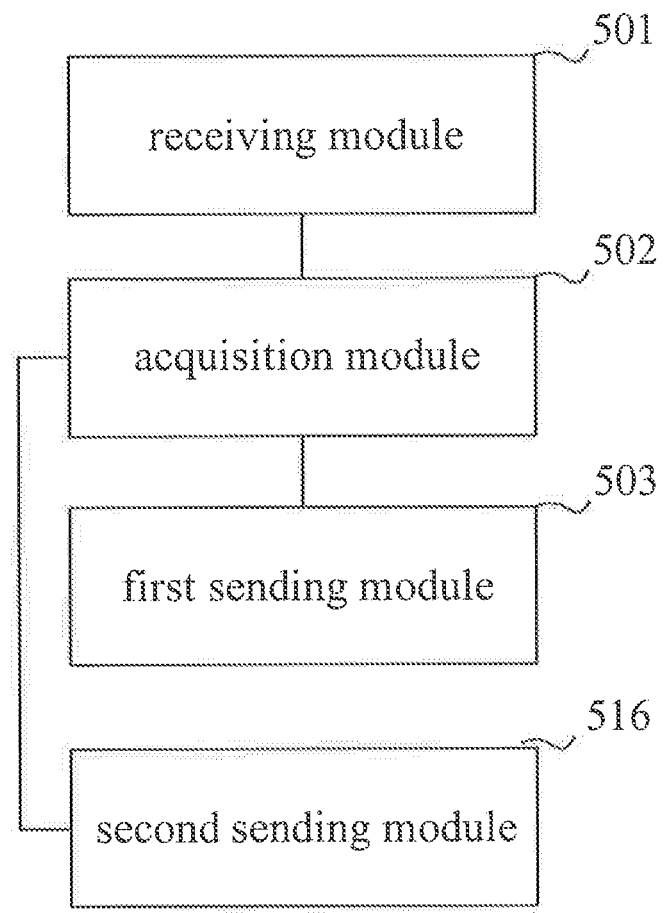
FIG. 30 is a block diagram of another device for displaying an audio cover, according to an exemplary embodiment.

Optionally, the target cover image is obtained by superposing the auxiliary dynamic image on the target static image. FIG. 30 is a block diagram of a device for displaying an audio cover, according to another exemplary embodiment. The device may be used in the server 110 shown in FIG. 1. As shown in FIG. 30, the device further includes:

a second sending module 516 configured to send a display parameter to the terminal, wherein the terminal is configured to set a display characteristic of the auxiliary dynamic image according to the display parameter and the display parameter includes at least one of the following: transparency, a resolution, or an image position.

Optionally, the target cover image includes any one of a dynamic picture, a video, and dynamic display information, wherein the dynamic display information includes a dynamic parameter and a static picture, wherein the dynamic parameter indicates a changing characteristic of the display parameter during display of the static picture.

As described above, according to the disclosed audio cover display device, the acquisition module acquires the target cover image according to the acquisition request sent by the terminal, the sending module provides the target cover image to the terminal, and the terminal displays the target cover image. Because the target cover image is a dynamic cover image and/or a static cover image, the display forms of the audio cover become versatile, and the audio cover may be displayed more flexibly.

Figure 31:
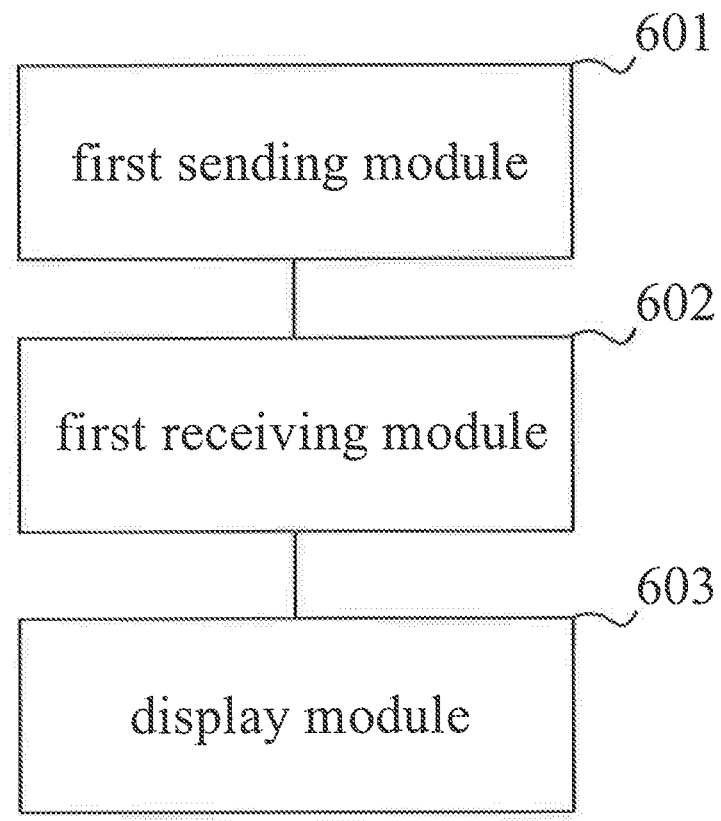
FIG. 31 is a block diagram of another device for displaying an audio cover, according to an exemplary embodiment.

FIG. 31 is a block diagram of another device for displaying an audio cover, according to another exemplary embodiment. As shown in FIG. 31, the device includes:

a first sending module 601 configured to, when an audio cover is to be acquired, send an acquisition request that requests a target cover image to a server, wherein the server is configured to acquire the target cover image according to the acquisition request and the target cover image is a dynamic cover image and/or a static cover image corresponding to an audio file;

a first receiving module 602 configured to receive the target cover image sent by the server; and a display module 603 configured to, when the audio cover is be displayed, display the pre-acquired target cover image.

As described above, according to the disclosed audio cover display device, a server acquires a target cover image according to an acquisition request sent by a terminal, and provides the target cover image to the terminal. The terminal displays the target cover image. Because the target cover image is a dynamic cover image and/or a static cover image, display forms of the audio cover become versatile, and the audio cover may be displayed more flexibly.

Optionally, the display module 603 is configured to display the pre-acquired target cover image in an image display area of a cover display interface of the terminal.

Figure 32:
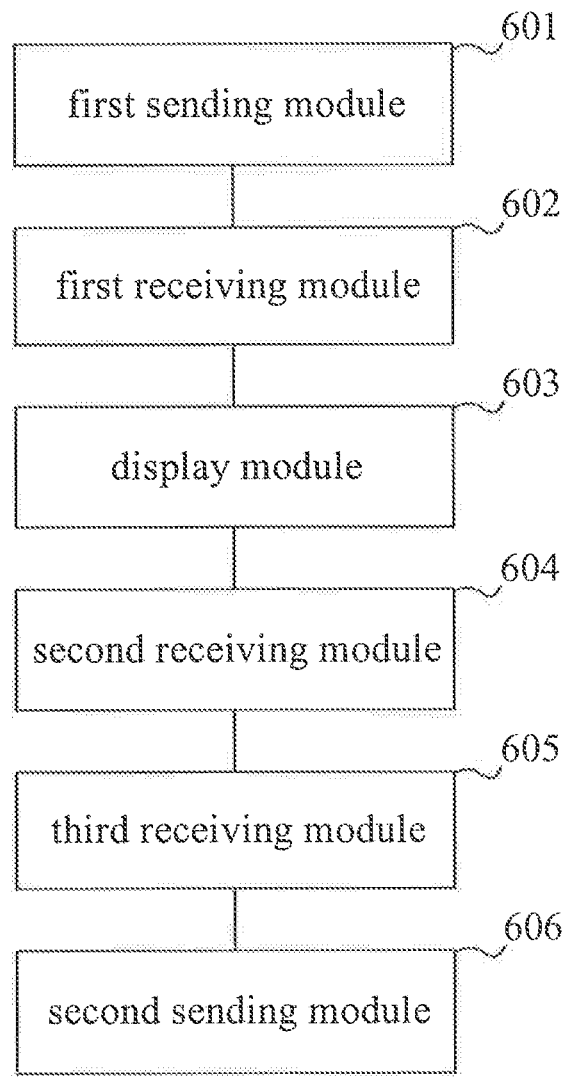
FIG. 32 is a block diagram of another device for displaying an audio cover, according to an exemplary embodiment.

FIG. 32 is a block diagram of another device for displaying an audio cover, according to another exemplary embodiment. As shown in FIG. 32, the device includes:

a second receiving module 604 configured to receive at least two dynamic images that are provided by the server and associated with target scene information, wherein the target scene information represents a scene characteristic associated with target audio data, or, the target scene information represents a scene characteristic of an environment where a terminal is located;

a third receiving module 605 configured to receive the dynamic image selected by a user from the at least two dynamic images associated with the target scene information; and a second sending module 606, configured to send a selection instruction to the server, wherein the selection instruction includes the dynamic image selected by the user, and the server is configured to determine the dynamic image selected by the user as an auxiliary dynamic image.

Figure 33:
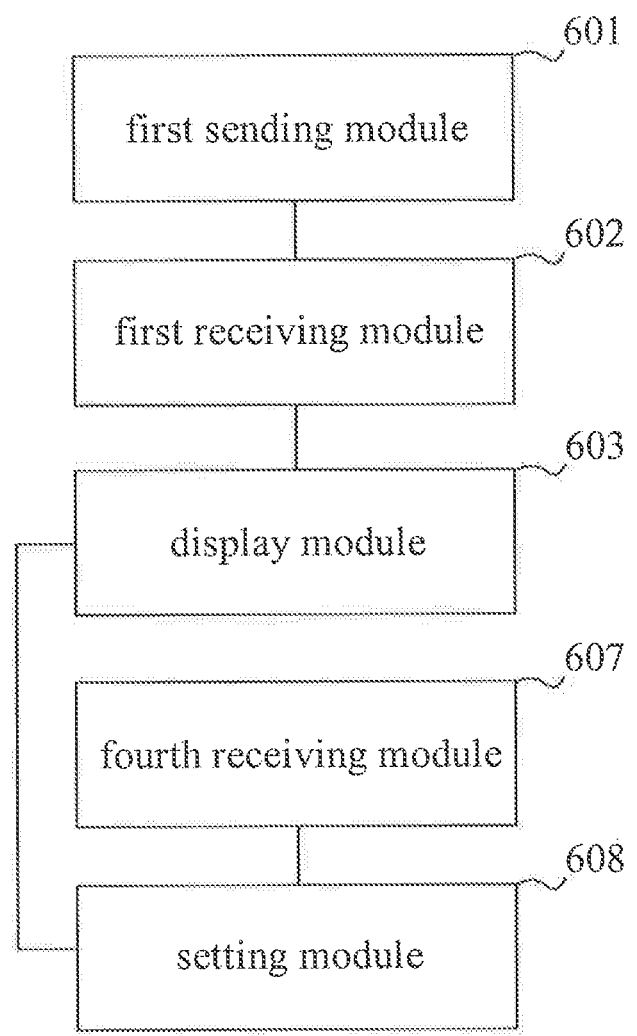
FIG. 33 is a block diagram of another device for displaying an audio cover, according to an exemplary embodiment.

Optionally, the target cover image is obtained by superposing an auxiliary dynamic image on a target static image. FIG. 33 is a block diagram of another device for displaying an audio cover, according to another exemplary embodiment. As shown in FIG. 33, the device includes:

a fourth receiving module 607 configured to receive a display parameter sent by the server; and a setting module 608 configured to set a display characteristic of the auxiliary dynamic image according to the display parameter, wherein the display parameter includes at least one of the following: transparency, a resolution, or an image position.

Optionally, the target cover image includes any one of a dynamic picture, a video, and dynamic display information, wherein the dynamic display information includes a dynamic parameter and a static picture, wherein the dynamic parameter indicates a changing characteristic of the display parameter during display of the static picture, and the display module 603 is configured to:

detect content of the target cover image; and if the content of the target cover image includes the dynamic display information, display the static picture, and change the characteristic of the display parameter during display of the static picture according to the dynamic parameter.

Figure 34:
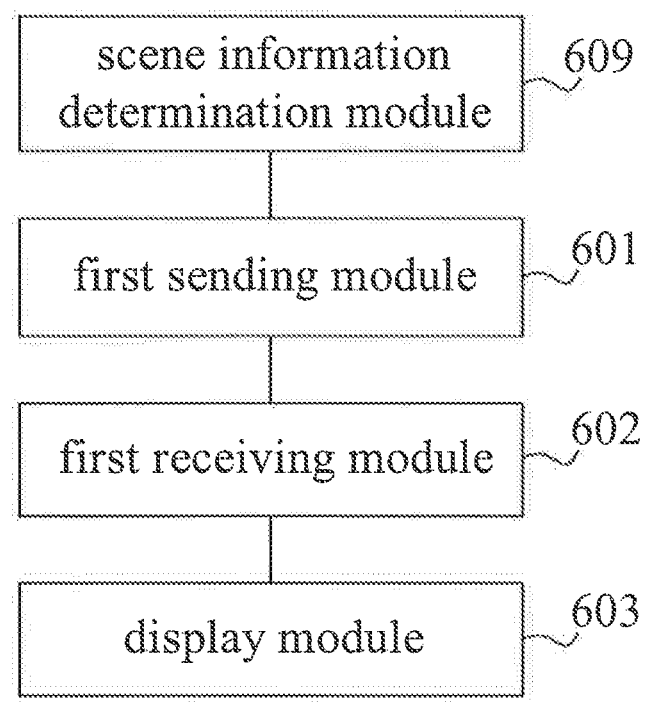
FIG. 34 is a block diagram of another device for displaying an audio cover, according to an exemplary embodiment.

Optionally, the acquisition request includes target scene information, wherein the target scene information represents a scene characteristic of an environment in which a terminal is located. FIG. 34 is a block diagram of another device for displaying an audio cover, according to another exemplary embodiment. As shown in FIG. 34, the device further includes a scene information determination module 609, wherein the scene information determination module 609 is configured to:

determine the target scene information through an App installed in the terminal and associated with the target scene information; or display scene information prompting options, and receive target scene information selected by the user from the scene information prompting options; or display a scene information input box, and receive target scene information input by the user in the scene information input box; or send an information acquisition request to a function server having a target scene information determination function, and receive target scene information sent by the function server.

Optionally, the target scene information includes at least one of the following: a season, a geographical location, a landmark, weather, mood, or time.

As described above, according to the disclosed audio cover display device, a server acquires a target cover image according to an acquisition request sent by a terminal, and provides the target cover image to the terminal. The terminal displays the target cover image. Because the target cover image is a dynamic cover image and/or a static cover image, the display forms of the audio cover become versatile, and the audio cover may be displayed more flexibly.

Figure 35:
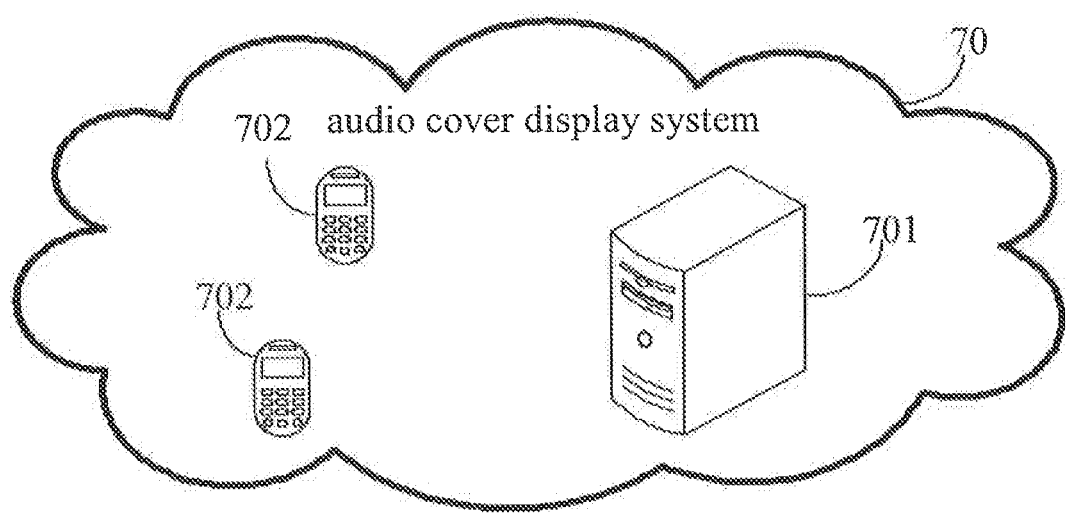
FIG. 35 is a schematic diagram illustrating a system for displaying an audio cover, according to an exemplary embodiment.

FIG. 35 is a schematic diagram illustrating an audio cover display system 70, according to an exemplary embodiment. As shown in FIG. 35, the audio cover display system 70 includes a server 701 and at least one terminal 702, wherein the server 701 includes the audio cover display device shown in FIG. 22, FIG. 26, FIG. 27, FIG. 28 or FIG. 29; and the terminal 702 includes the audio cover display device shown in FIG. 31 to FIG. 34.

Furthermore, an embodiment of the present disclosure also provides a device for displaying an audio cover, which includes:

a processor; and a memory configured to store an instruction executable by the processor, wherein the processor is configured to:

receive, from a terminal, an acquisition request that requests a target cover image;

acquire the target cover image according to the acquisition request, wherein the target cover image is a dynamic cover image and/or a static cover image corresponding to an audio file; and send the target cover image to the terminal, wherein the terminal is configured to display the target cover image.

An embodiment of the present disclosure further provides a device for displaying an audio cover, which includes:

a processor; and a memory configured to store an instruction executable by the processor, wherein the processor is configured to:

when an audio cover is required to be acquired, send an acquisition request to a server that requests a target cover image, wherein the server is configured to acquire the target cover image according to the acquisition request and the target cover image is a dynamic cover image and/or a static cover image corresponding to an audio file;

receive the target cover image sent by the server; and when the audio cover is required to be displayed, display the pre-acquired target cover image.

Figure 36:
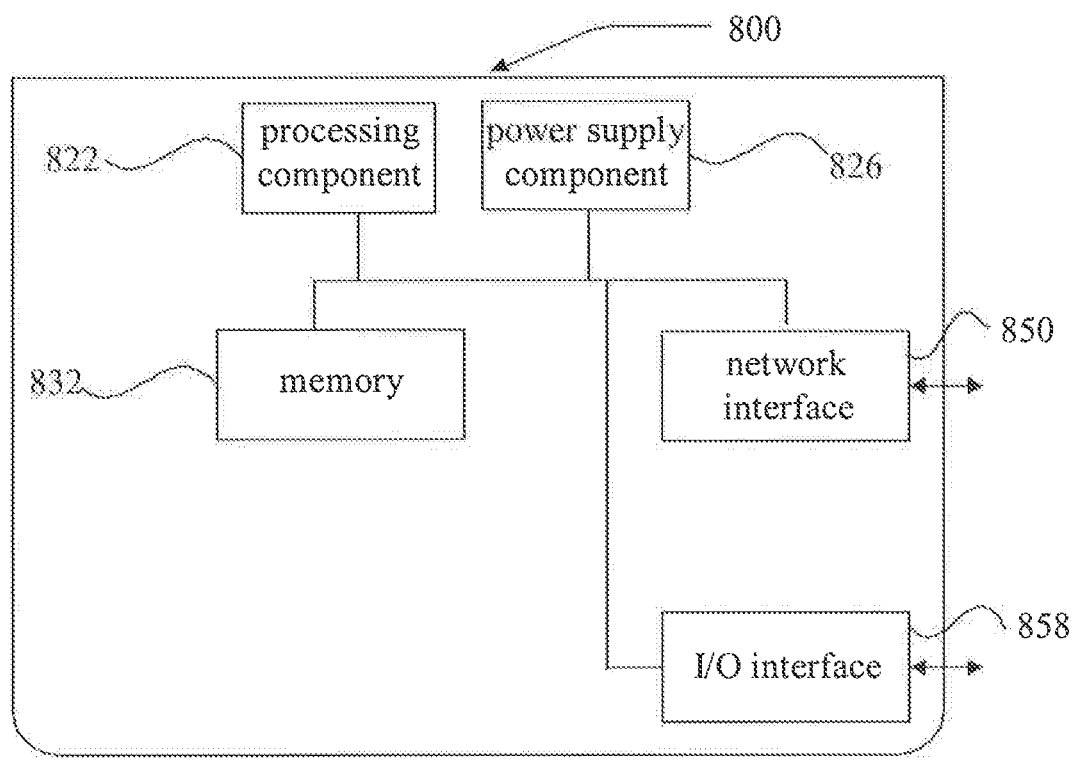
FIG. 36 is a block diagram of a device for displaying an audio cover, according to an exemplary embodiment.

FIG. 36 is a block diagram of a device for displaying an audio cover 800, according to an exemplary embodiment. For example, the device 800 may be provided as a server. Referring to FIG. 36, the device 800 includes a processing component 822, which further includes one or more processors, and a memory resource represented by a memory 832 configured to store instructions such as application programs executable by the processing component 822. The application programs stored in the memory 832 may include one or more than one module each corresponding to a set of instructions. In addition, the processing component 822 is configured to execute the instructions to perform the disclosed audio cover display methods.

The device 800 may further include a power component 826 configured to execute power management of the device 800, a wired or wireless network interface 850 configured to connect the device 800 to a network, and an I/O interface 858. The device 800 may be operated on the basis of an operating system stored in the memory 832, such as Windows Server™, Mac OS X™, Unix™, Linux™ or FreeBSD™.

Figure 37:
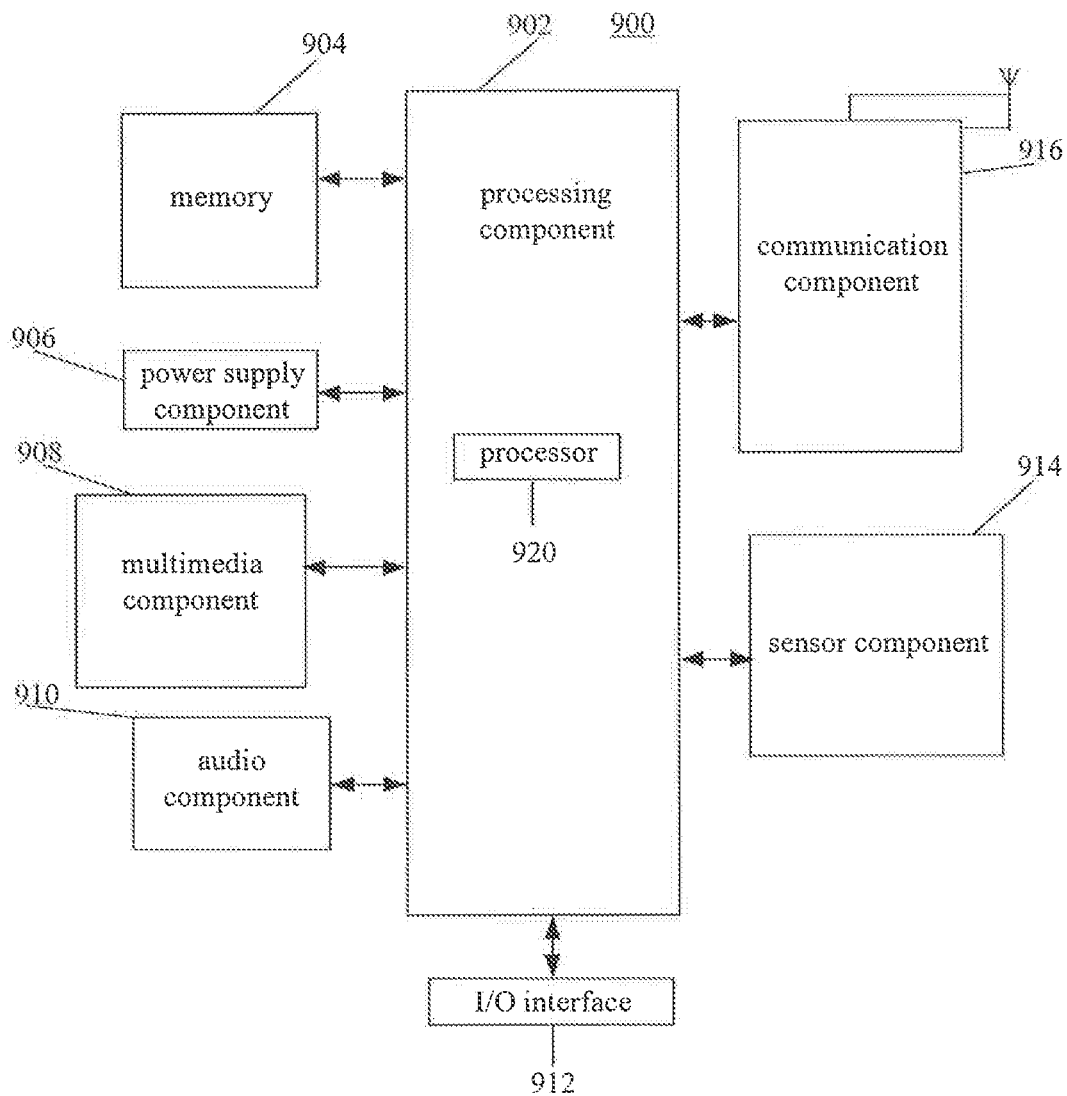
FIG. 37 is a block diagram of another device for displaying an audio cover, according to an exemplary embodiment.

FIG. 37 is a block diagram of a device for displaying an audio cover 900, according to an exemplary embodiment. For example, the device 900 may be a mobile phone, a computer, a digital broadcast terminal, a message transceiver device, a gaming console, a tablet device, a medical device, fitness equipment, a personal digital assistant and the like.

Referring to FIG. 37, the device 900 may include one or more of the following components: a processing component 902, a memory 904, a power component 906, a multimedia component 908, an audio component 910, an I/O interface 912, a sensor component 914, and a communication component 916.

The processing component 902 is configured to control overall operations of the device 900, such as the operations associated with display, telephone calls, data communications, camera operations, and recording operations. The processing component 902 may include one or more processors 920 to execute instructions to perform all or part of the steps of the disclosed methods. Moreover, the processing component 902 may include one or more modules that facilitate interaction between the processing component 902 and the other components. For instance, the processing component 902 may include a multimedia module configured to facilitate interaction between the multimedia component 908 and the processing component 902.

The memory 904 is configured to store various types of data to support the operation of the device 900. Examples of such data include instructions for any applications or methods operated on the device 900, contact data, phonebook data, messages, pictures, video, etc. The memory 904 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

The power component 906 provides power for various components of the device 900. The power component 906 may include a power management system, one or more power supplies, and any other components associated with the generation, management, and distribution of power in the device 900.

The multimedia component 908 includes a display interface providing an output interface between the device 900 and a user. In some embodiments, the display interface may include a Liquid Crystal Display (LCD) and a Touch Panel (TP). If the display interface includes the TP, the display interface may be implemented as a touch screen configured to receive an input signal from the user. The TP includes one or more touch sensors to sense touches, swipes and gestures on the TP. The touch sensors may not only sense a boundary of a touch or swipe action, but also sense a duration and pressure associated with the touch or swipe action. In some embodiments, the multimedia component 908 includes a front camera and/or a rear camera. The front camera and/or the rear camera may receive external multimedia data when the device 900 is in an operation mode, such as a photographing mode or a video mode. Each of the front camera and the rear camera may be a fixed optical lens system or have focus and optical zoom capability.

The audio component 910 is configured to output and/or input an audio signal. For example, the audio component 910 includes a microphone configured to receive an external audio signal when the device 900 is in the operation mode, such as a call mode, a recording mode, and a voice recognition mode. The received audio signal may be further stored in the memory 904 or sent through the communication component 916. In some embodiments, the audio component 910 further includes a speaker configured to output audio signals.

The I/O interface 912 provides an interface between the processing component 902 and a peripheral interface module. The peripheral interface module may be a keyboard, a click wheel, a button and the like. The button may include, but not limited to: a home button, a volume button, a starting button and a locking button.

The sensor component 914 includes one or more sensors configured to provide status assessment of various aspects of the device 900. For instance, the sensor component 914 may detect an open/closed status of the device 900 and relative positioning of components, such as a display and small keyboard of the device 900. The sensor component 914 may further detect a change in position of the device 900 or a component of the device 900, a presence or absence of contact between the user and the device 900, an orientation or an acceleration/deceleration of the device 900 and a change in temperature of the device 900. The sensor component 914 may include a proximity sensor configured to detect presence of a nearby object without any physical contact. The sensor component 914 may also include a light sensor, such as a Complementary Metal Oxide Semiconductor (CMOS) or Charge Coupled Device (CCD) image sensor, configured for use in an imaging application. In some embodiments, the sensor component 914 may also include an acceleration sensor, a gyroscope sensor, a magnetic sensor, a pressure sensor or a temperature sensor.

The communication component 916 is configured to facilitate wired or wireless communication between the device 900 and other devices. The device 900 may access a wireless network based on a communication standard, such as WiFi, 2G, or 3G, or a combination thereof. In an exemplary embodiment, the communication component 916 receives a broadcast signal or broadcast associated information from an external broadcast management system through a broadcast channel. In an exemplary embodiment, the communication component 916 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a BlueTooth (BT) technology and another technology.

In an exemplary embodiment, the device 900 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the disclosed methods.

In an exemplary embodiment, there is also provided a non-transitory computer-readable storage medium including instructions, such as those included in the memory 904, executable by the processor 920 in the device 900, to implement the disclosed methods. For example, the non-transitory computer-readable storage medium may be a ROM, a Random Access Memory (RAM), a Compact Disc Read-Only Memory (CD-ROM), a magnetic tape, a floppy disc, an optical data storage device and the like.

According to the non-transitory computer-readable storage medium, when an instruction in the storage medium is executed by the processor of the device 900, the device 900 may execute a method for displaying an audio cover, the method including:

sending an acquisition request to a server that requests a target cover image, wherein the server is configured to acquire the target cover image according to the acquisition request and the target cover image is a dynamic cover image;

receiving the target cover image sent by the server; and displaying the target cover image.

Optionally, the target cover image includes any one of a dynamic picture, a video, and dynamic display information, wherein the dynamic display information includes a dynamic parameter and a static picture, wherein the dynamic parameter indicates a changing characteristic of the display parameter during display of the static picture, and displaying the target cover image includes:

detecting content of the target cover image; and if the target cover image includes the dynamic display information, displaying the static picture, and changing the characteristic of the display parameter during display of the static picture according to the dynamic parameter.

Figure 38:
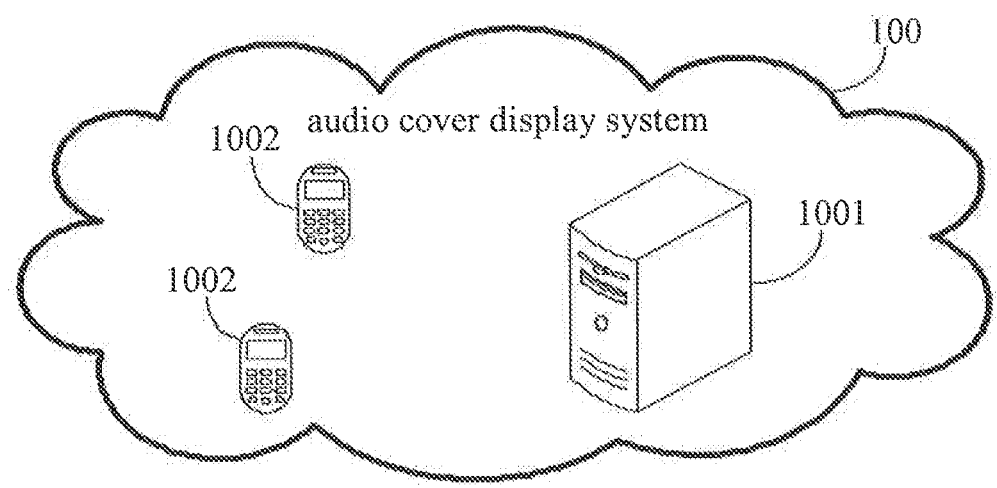
FIG. 38 is a schematic diagram illustrating a system for displaying an audio cover, according to an exemplary embodiment.

FIG. 38 is a schematic diagram illustrating an audio cover display system 100, according to an exemplary embodiment. As shown in FIG. 38, the audio cover display system 100 includes a server 1001 and at least one terminal 1002. The server 1001 includes the audio cover display device 800 shown in FIG. 36. The terminal 1002 includes the audio cover display device 900 shown in FIG. 37.

Other embodiments of the present disclosure will be apparent to those skilled in the art from consideration of the specification and practice of the embodiments of the present disclosure disclosed here. This application is intended to cover any variations, uses, or adaptations of the embodiments of the present disclosure following the general principles thereof and including such departures from the embodiments of the present disclosure as come within known or customary practice in the art. It is intended that the specification and examples be considered as exemplary only, with a true scope and spirit of the embodiments of the present disclosure being indicated by the following claims.

According to the audio cover display method and device provided by the embodiments of the present disclosure, a server acquires a target cover image according to an acquisition request sent by a terminal, and provides the target cover image to the terminal, and the terminal displays the target cover image. Because the target cover image is a dynamic cover image and/or a static cover image, the display forms of the audio cover become versatile, and the audio cover may be displayed more flexibly.

It will be appreciated that the embodiments of the present disclosure are not limited to the exact construction that has been described above and illustrated in the accompanying drawings, and that various modifications and changes may be made without departing from the scope thereof. It is intended that the scope of the embodiments of the present disclosure only be limited by the appended claims.

What is claimed is:

1. A method for displaying an audio cover, comprising:

receiving from a terminal an acquisition request that requests a target cover image;

acquiring the target cover image according to the acquisition request, wherein the target cover image is a dynamic cover image corresponding to an audio file; and sending the target cover image to the terminal, wherein the terminal is configured to display the target cover image;

wherein acquiring the target cover image according to the acquisition request comprises:

determining target audio data according to the acquisition request;

determining a target static image from a static cover database according to the target audio data;

determining target scene information by analyzing description information of the target audio data, or type of the target audio data, wherein the target scene information is for representing a scene characteristic associated with the target audio data and includes at least one of the following: season, a geographical location, a landmark, weather, or time, the time being one of morning, afternoon, or evening;

acquiring an auxiliary dynamic image associated with the target scene information based on preset relationship between scene information and dynamic image, wherein the auxiliary dynamic image includes any one of a dynamic picture or dynamic display information; and processing the target static image using the auxiliary dynamic image to obtain the target cover image, wherein processing the target static image using the auxiliary dynamic image to obtain the target cover image comprises at least one of:

superposing the auxiliary dynamic image on the target static image to obtain the target cover image; or combining the auxiliary dynamic image and the target static image to obtain the target cover image.

2. The method according to claim 1, wherein the acquisition request comprises target scene information, wherein the target scene information represents a scene characteristic of an environment in which the terminal is located;

the acquiring the target cover image according to the acquisition request comprises:

acquiring a target static image according to the acquisition request;

acquiring an auxiliary dynamic image associated with the target scene information; and processing the target static image using the auxiliary dynamic image to obtain the target cover image.

3. The method according to claim 1, wherein
the acquiring an auxiliary dynamic image associated with the target scene information comprises:
querying a preset relationship between scene information and a dynamic image;
if there exists a dynamic image associated with the target scene information in the preset relationship, determining the dynamic image associated with the target scene information as the auxiliary dynamic image; and
if there exist at least two dynamic images associated with the target scene information in the preset relationship, selecting a dynamic image from the at least two dynamic images associated with the target scene information as the auxiliary dynamic image according to a preset rule.

4. The method according to claim 3, wherein the selecting a dynamic image from the at least two dynamic images associated with the target scene information as the auxiliary dynamic image according to a preset rule comprises at least one of:
randomly selecting a dynamic image from the at least two dynamic images associated with the target scene information as the auxiliary dynamic image;
selecting a dynamic image that appears most frequently from the at least two dynamic images associated with the target scene information as the auxiliary dynamic image;
superposing the at least two dynamic images associated with the target scene information to form the auxiliary dynamic image; or
providing the at least two dynamic images associated with the target scene information to the terminal, receiving a selection instruction sent by the terminal, wherein the selection instruction indicates a dynamic image selected by a user from the at least two dynamic images associated with the target scene information, and determining the dynamic image selected by the user as the auxiliary dynamic image.

5. The method according to claim 1, further comprising:
judging whether the auxiliary dynamic image associated with the target scene information is stored in a server; and
if the auxiliary dynamic image is not stored in the server, determining the target static image acquired according to the acquisition request as the target cover image.

6. The method according to claim 1, wherein
the acquiring the target cover image according to the acquisition request comprises:
determining target audio data according to the acquisition request; and
determining a dynamic image that is acquired from a preset dynamic cover database and that corresponds to the target audio data as the target cover image, wherein the dynamic cover database is configured to record audio information and each piece of audio information comprises audio data and a dynamic image.

7. The method according to claim 6, further comprising:
judging whether the dynamic image corresponding to the target audio data is stored in the dynamic cover database; and
if the dynamic image corresponding to the target audio data is not stored in the dynamic cover database, determining the target static image acquired according to the acquisition request as the target cover image.

8. The method according to claim 6, further comprising:
receiving newly added audio information, wherein the newly added audio information comprises audio data and a static image;
determining scene information according to the audio data, wherein the scene information represents a scene characteristic associated with the audio data;
determining an auxiliary dynamic image associated with the scene information;
processing the static image using the auxiliary dynamic image to obtain a dynamic image;
using the dynamic image to update the newly added audio information to obtain updated audio information, wherein the updated audio information comprises the audio data and the dynamic image; and
storing the updated audio information into the preset dynamic cover database, wherein the audio information recorded in the preset dynamic cover database comprises the dynamic image.

9. The method according to claim 6, further comprising:
receiving newly added audio information, wherein the newly added audio information comprises a dynamic image; and
storing the newly added audio information into the preset dynamic cover database, wherein the audio information recorded in the preset dynamic cover database comprises the dynamic image.

10. The method according to claim 1, wherein
the target cover image comprises at least one of a dynamic picture, a video, or dynamic display information;
the dynamic display information comprises: a dynamic parameter and a static picture; and
the dynamic parameter indicates a changing characteristic of the display parameter during display of the static picture.

11. A method for displaying an audio cover, comprising:
when an audio cover is to be acquired, sending to a server an acquisition request that requests a target cover image, wherein the server is configured to acquire the target cover image according to the acquisition request and the target cover image is a dynamic cover image corresponding to an audio file;
receiving the target cover image sent by the server; and
when the audio cover is to be displayed, displaying the pre-acquired target cover image;
wherein the server is further configured to:
determine target audio data according to the acquisition request;
determine a target static image from a static cover database according to the target audio data;
determine target scene information by analyzing description information of the target audio data, or type of the target audio data, wherein the target scene information is for representing a scene characteristic associated with the target audio data and includes at least one of the following: season, a geographical location, a landmark, weather, or time, the time being one of morning, afternoon, or evening;
acquire an auxiliary dynamic image associated with the target scene information based on preset relationship between scene information and dynamic image, wherein the auxiliary dynamic image includes any one of a dynamic picture or dynamic display information; and
process the target static image using the auxiliary dynamic image to obtain the target cover image, wherein the server is further configured to implement at least one of the following operations to obtain the target cover image:
   superpose the auxiliary dynamic image on the target static image to obtain the target cover image; or
   combine the auxiliary dynamic image and the target static image to obtain the target cover image.

12. The method according to claim 11, wherein the displaying the pre-acquired target cover image comprises:
   displaying the pre-acquired target cover image in an image display area of a cover display interface of a terminal.

13. The method according to claim 11, further comprising:
   receiving at least two dynamic images provided by the server and associated with target scene information, wherein the target scene information represents a scene characteristic associated with target audio data, or, the target scene information represents a scene characteristic of an environment in which a terminal is located;
   receiving a dynamic image selected by a user from the at least two dynamic images associated with the target scene information; and
   sending a selection instruction to the server, wherein the selection instruction comprises the dynamic image selected by the user and the server is configured to determine the dynamic image selected by the user as an auxiliary dynamic image.

14. The method according to claim 11, wherein the target cover image is obtained by superposing the auxiliary dynamic image on a target static image, and the method further comprises:
   receiving a display parameter sent by the server; and
   setting a display characteristic of the auxiliary dynamic image according to the display parameter, wherein the display parameter comprises at least one of transparency, a resolution, or an image position.

15. The method according to claim 11, wherein the target cover image comprises at least one of a dynamic picture, a video, or dynamic display information;
   the dynamic display information comprises a dynamic parameter and a static picture; and
   the dynamic parameter indicates a changing characteristic of the display parameter during display of the static picture;
   the displaying the pre-acquired target cover image comprises:
   detecting content of the target cover image; and
   if the target cover image comprises the dynamic display information, displaying the static picture, and changing the characteristic of the display parameter during display of the static picture according to the dynamic parameter.

16. The method according to claim 11, wherein the acquisition request comprises target scene information, and wherein the target scene information represents a scene characteristic of an environment in which a terminal is located;
   the method further comprises at least one of:
   determining the target scene information through an Application (App) installed in the terminal and associated with the target scene information;
   displaying scene information prompting options, and receiving target scene information selected by the user from the scene information prompting options;
   displaying a scene information input box, and receiving target scene information input by the user in the scene information input box; or
   sending an information acquisition request to a function server having a target scene information determination function, and receiving target scene information sent by the function server.

17. A device for displaying an audio cover, comprising:
   a processor; and
   a memory configured to store an instruction executable by the processor;
   wherein the processor is configured to:
   receive from a terminal an acquisition request that requests a target cover image;
   acquire the target cover image according to the acquisition request, wherein the target cover image is a dynamic cover image corresponding to an audio file; and
   send the target cover image to the terminal, wherein the terminal is configured to display the target cover image;
   wherein the operation of acquiring the target cover image according to the acquisition request comprises:
   determining target audio data according to the acquisition request;
   determining a target static image from a static cover database according to the target audio data;
   determining target scene information by analyzing description information of the target audio data, or type of the target audio data, wherein the target scene information is for representing a scene characteristic associated with the target audio data and includes at least one of the following: season, a geographical location, a landmark, weather, or time, the time being one of morning, afternoon, or evening;
   acquiring an auxiliary dynamic image associated with the target scene information based on preset relationship between scene information and dynamic image, wherein the auxiliary dynamic image includes any one of a dynamic picture or dynamic display information; and
   processing the target static image using the auxiliary dynamic image to obtain the target cover image,
   wherein processing the target static image using the auxiliary dynamic image to obtain the target cover image comprises at least one of:
   superposing the auxiliary dynamic image on the target static image to obtain the target cover image; or
   combining the auxiliary dynamic image and the target static image to obtain the target cover image.

18. The device according to claim 17, wherein the acquisition request comprises target scene information, wherein the target scene information represents a scene characteristic of an environment in which a terminal is located;
   the processor is further configured to:
   acquire a target static image according to the acquisition request;
   acquire an auxiliary dynamic image associated with the target scene information; and
   process the target static image using the auxiliary dynamic image to obtain the target cover image.

19. The device according to claim 17, wherein the processor is further configured to:
   determine target audio data according to the acquisition request; and determine a dynamic image that is acquired from a preset dynamic cover database and that corresponds to the target audio data as the target cover image, wherein the dynamic cover database is configured to record audio information and each piece of audio information comprises audio data and a dynamic image.

20. A device for displaying an audio cover, comprising:
a processor; and
a memory configured to store an instruction executable by the processor;
wherein the processor is configured to:
when an audio cover is to be acquired, send to a server an acquisition request that requests a target cover image, wherein the server is configured to acquire the target cover image according to the acquisition request and the target cover image is a dynamic cover image corresponding to an audio file;
receive the target cover image sent by the server; and
when the audio cover is to be displayed, display the pre-acquired target cover image;
wherein the server is further configured to: determine target audio data according to the acquisition request; determine a target static image from a static cover database according to the target audio data; determine target scene information by analyzing description information of the target audio data, or type of the target audio data, wherein the target scene information is for representing a scene characteristic associated with the target audio data and includes at least one of the following: season, a geographical location, a landmark, weather, or time, the time being one of morning, afternoon, or evening; acquire an auxiliary dynamic image associated with the target scene information based on preset relationship between scene information and dynamic image, wherein the auxiliary dynamic image includes any one of a dynamic picture or dynamic display information; and process the target static image using the auxiliary dynamic image to obtain the target cover image,
wherein the server is further configured to implement at least one of the following operations to obtain the target cover image:
superpose the auxiliary dynamic image on the target static image to obtain the target cover image; or
combine the auxiliary dynamic image and the target static image to obtain the target cover image.

21. The device according to claim 20, wherein the target cover image comprises at least one of a dynamic picture, a video, or dynamic display information;
the dynamic display information comprises a dynamic parameter and a static picture;
the dynamic parameter indicates a changing characteristic of the display parameter during display of the static picture; and
the processor is further configured to:
detect content of the target cover image; and
if the content of the target cover image comprises the dynamic display information, display the static picture, and change the characteristic of the display parameter during display of the static picture according to the dynamic parameter.

22. The device according to claim 20, wherein the acquisition request comprises target scene information, and wherein the target scene information represents a scene characteristic of an environment in which a terminal is located; and
the processor is further configured to perform at least one of the following:
determine the target scene information through an Application (App) installed in the terminal and associated with the target scene information;
display scene information prompting options, and receive target scene information selected by the user in the scene information prompting options;
display a scene information input box, and receive target scene information input by the user in the scene information input box; or
send an information acquisition request to a function server having a target scene information determination function, and receive target scene information sent by the function server.

* * * * *